United States Patent
Seitz, Jr.

(10) Patent No.: US 8,812,968 B2
(45) Date of Patent: Aug. 19, 2014

(54) SYSTEMS AND METHODS FOR DISPLAYING AND MANIPULATING IMAGES OF FLOOR COVERING ELEMENTS

(75) Inventor: Larry Keith Seitz, Jr., LaGrange, GA (US)

(73) Assignee: Milliken & Company, Spartanburg, SC (US)

(*) Notice: Subject to any disclaimer, the term of this patent is extended or adjusted under 35 U.S.C. 154(b) by 2236 days.

(21) Appl. No.: 10/137,680

(22) Filed: May 2, 2002

(65) Prior Publication Data

US 2002/0175942 A1 Nov. 28, 2002

Related U.S. Application Data

(60) Provisional application No. 60/288,484, filed on May 3, 2001.

(51) Int. Cl.
*G06F 3/048* (2013.01)

(52) U.S. Cl.
USPC ........... 715/765; 715/839; 715/962; 715/709; 715/731

(58) Field of Classification Search
CPC ....................... G06Q 30/0621; G06Q 30/0643
USPC ......... 345/760, 764, 765, 810, 840, 866, 962; 705/26, 27; 715/765, 839, 962, 709, 715/731
See application file for complete search history.

(56) References Cited

U.S. PATENT DOCUMENTS

| | | | |
|---|---|---|---|
| 4,116,626 A | 9/1978 | Varner | |
| 4,522,857 A | 6/1985 | Higgins | |
| 4,888,713 A | 12/1989 | Falk | |
| 5,016,183 A | 5/1991 | Shyong | |
| 5,053,956 A | 10/1991 | Donald et al. | |
| 5,136,520 A | 8/1992 | Cox | |
| 5,142,481 A | 8/1992 | Cox | |
| 5,208,592 A | 5/1993 | Johnson, Jr. | |
| 5,432,502 A | 7/1995 | Johnson, Jr. | |
| 5,459,435 A | 10/1995 | Taki | |
| 5,540,968 A | 7/1996 | Higgins | |
| 5,545,276 A | 8/1996 | Higgins | |
| 5,894,083 A | 4/1999 | Hiraoka et al. | |
| 5,948,500 A | 9/1999 | Higgins | |
| 5,966,454 A | 10/1999 | Thomas et al. | |
| 6,005,969 A * | 12/1999 | Thomas et al. | 382/162 |
| 6,010,243 A | 1/2000 | Hessler et al. | |
| 6,122,890 A * | 9/2000 | Pollitt | 52/747.11 |
| 6,203,881 B1 | 3/2001 | Higgins | |
| 6,343,264 B1 | 1/2002 | Fenton et al. | |
| 6,381,510 B1 | 4/2002 | Amidhozour et al. | |

(Continued)

FOREIGN PATENT DOCUMENTS

EP 0 270 088 B1 2/1987

*Primary Examiner* — Namitha Pillai
(74) *Attorney, Agent, or Firm* — Brenda D. Wentz

(57) ABSTRACT

A system, tool or method permitting a prospective purchaser of floor coverings or other surface coverings to engage in the contemporaneous manipulation and evaluation of various combinations of surface patterns, designs, colors, shapes, and the like as well as placement or orientations of the floor covering or surface covering elements prior to actual purchase and installation. For example, simulated tile elements having surface patterns corresponding to the surface patterns of the actual floor covering tile elements are provided in a manner such that each of the simulated tile elements may be rotated or replaced to simulate at least one alternative arrangement or layout.

3 Claims, 52 Drawing Sheets

(56) References Cited

U.S. PATENT DOCUMENTS

| | | | |
|---|---|---|---|
| 6,459,435 B1 * | 10/2002 | Eichel | 345/588 |
| 6,572,377 B2 * | 6/2003 | Masters | 434/72 |
| 6,664,972 B2 * | 12/2003 | Eichel et al. | 345/582 |
| 6,681,140 B1 * | 1/2004 | Heil | 700/95 |
| 6,790,042 B2 | 9/2004 | Worth | |
| 6,925,196 B2 * | 8/2005 | Kass et al. | 382/111 |
| 2001/0047251 A1 * | 11/2001 | Kemp | 703/1 |
| 2002/0010522 A1 * | 1/2002 | Martin | 700/97 |
| 2002/0030689 A1 * | 3/2002 | Eichel et al. | 345/588 |
| 2002/0107674 A1 * | 8/2002 | Bascle et al. | 703/1 |
| 2003/0001858 A1 * | 1/2003 | Jack | 345/582 |

\* cited by examiner

FIG. —1—
- Launch Photoshop 6.0

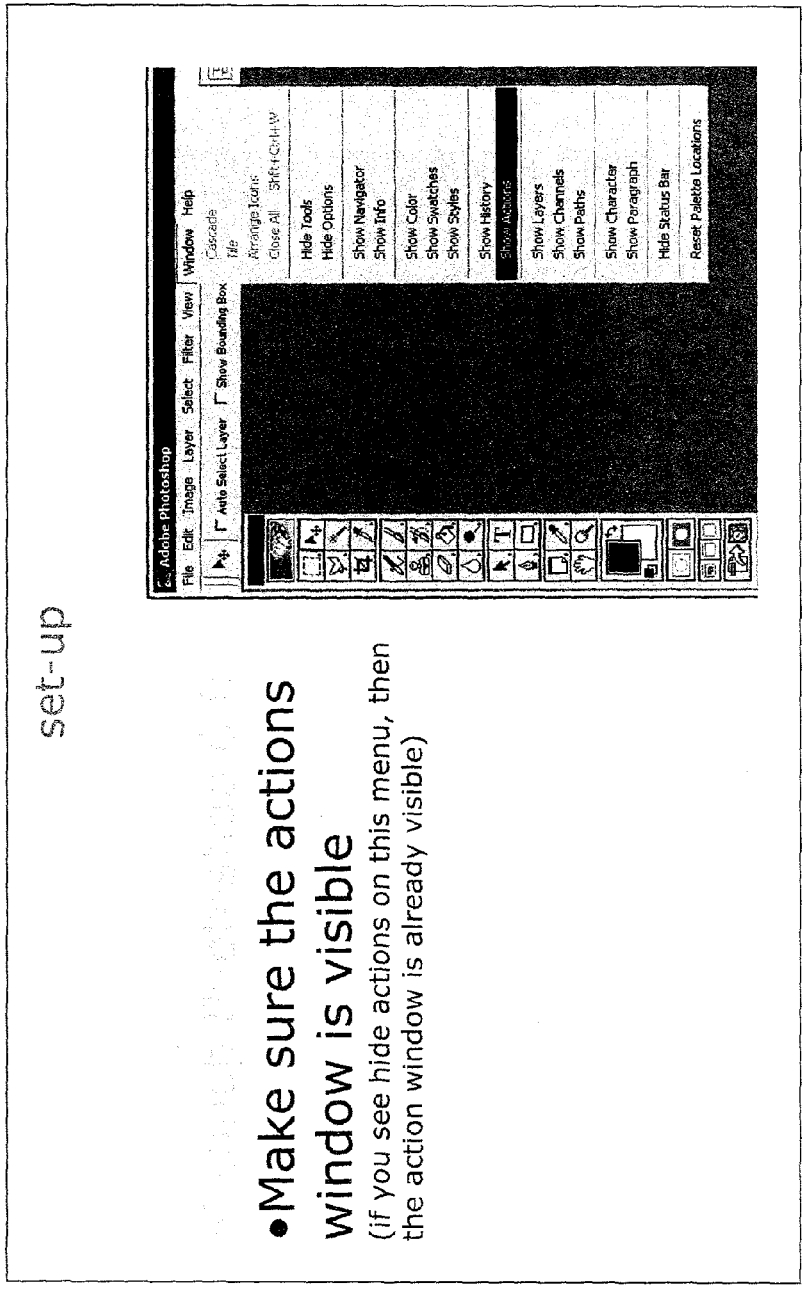
FIG. -2-

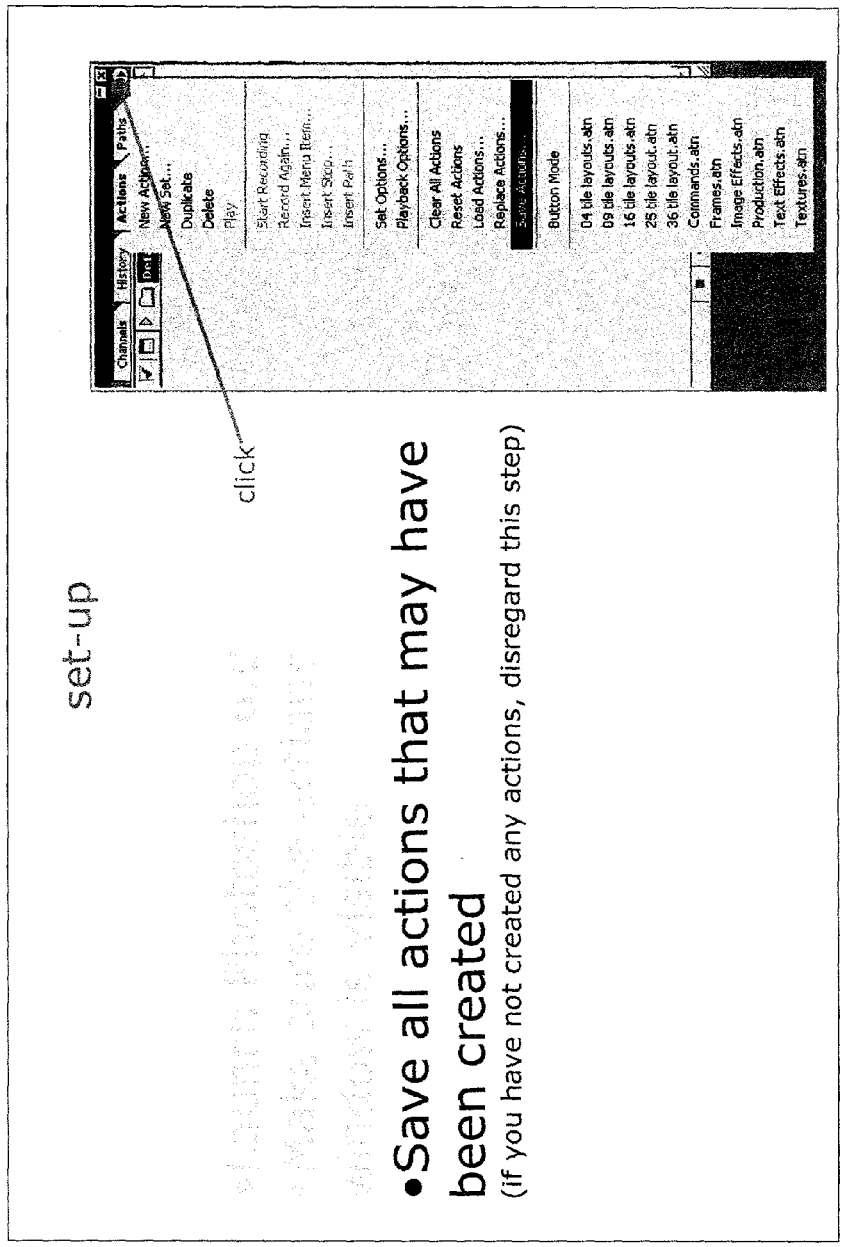
FIG. -3-

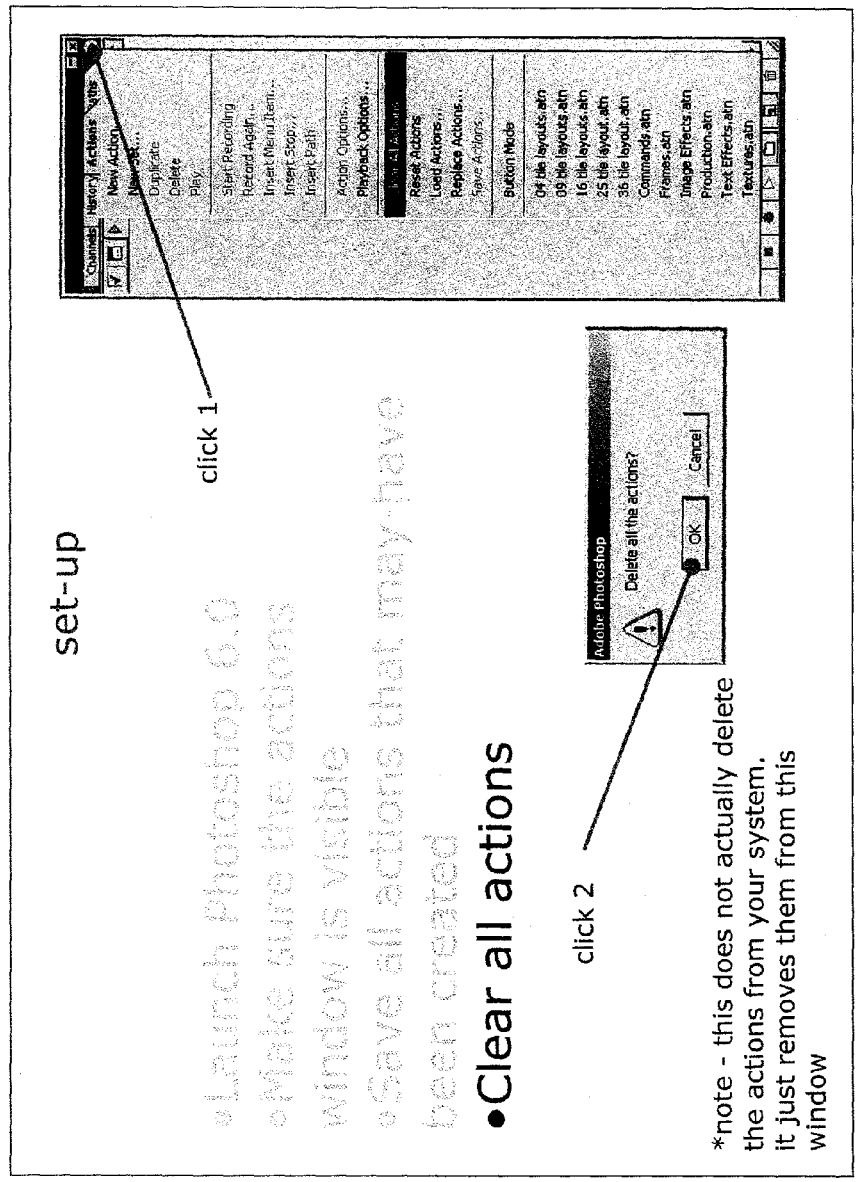
FIG. -4-

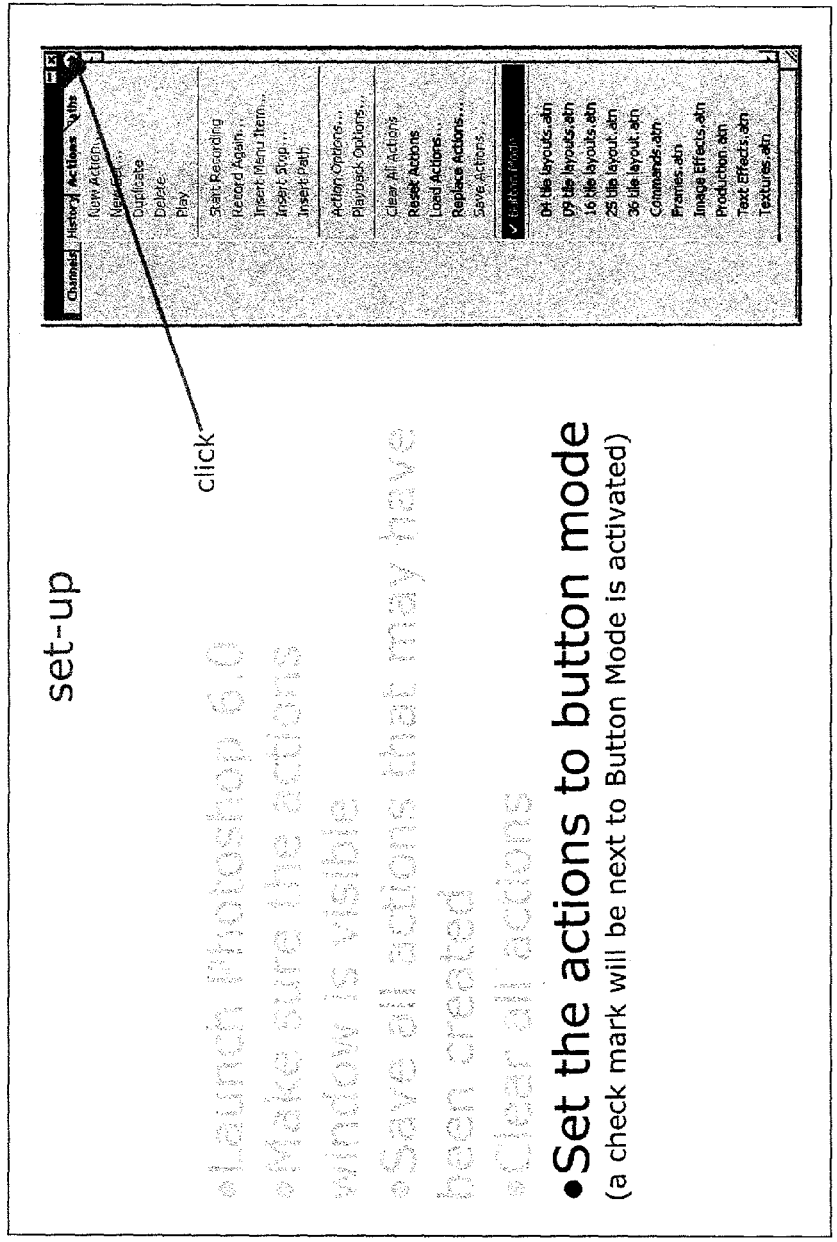
FIG. -5-

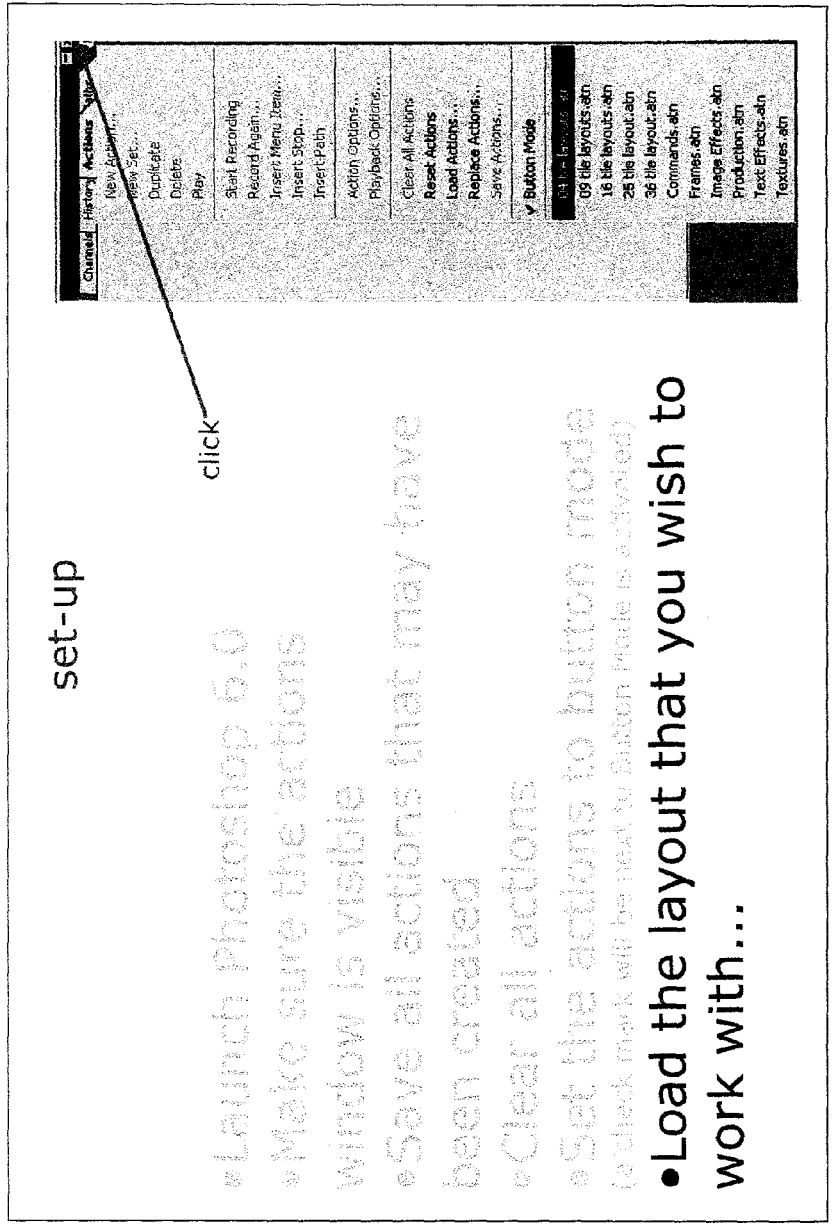
FIG. -6-

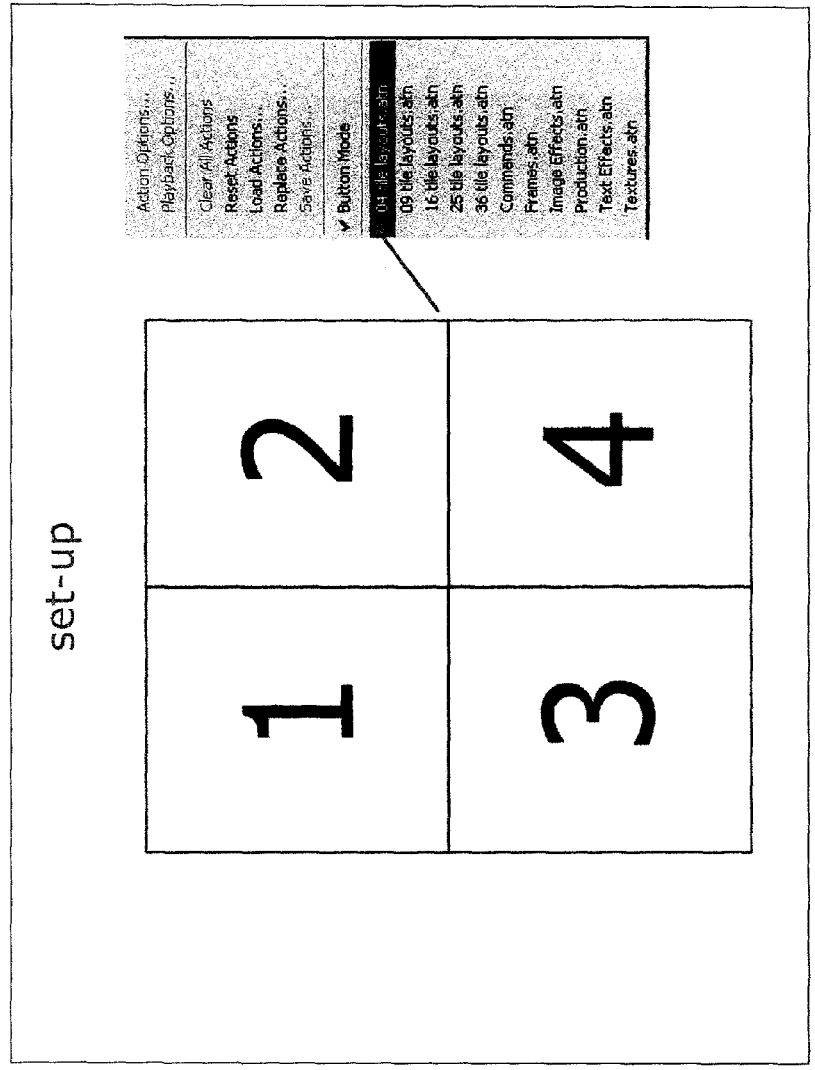
FIG. -7-

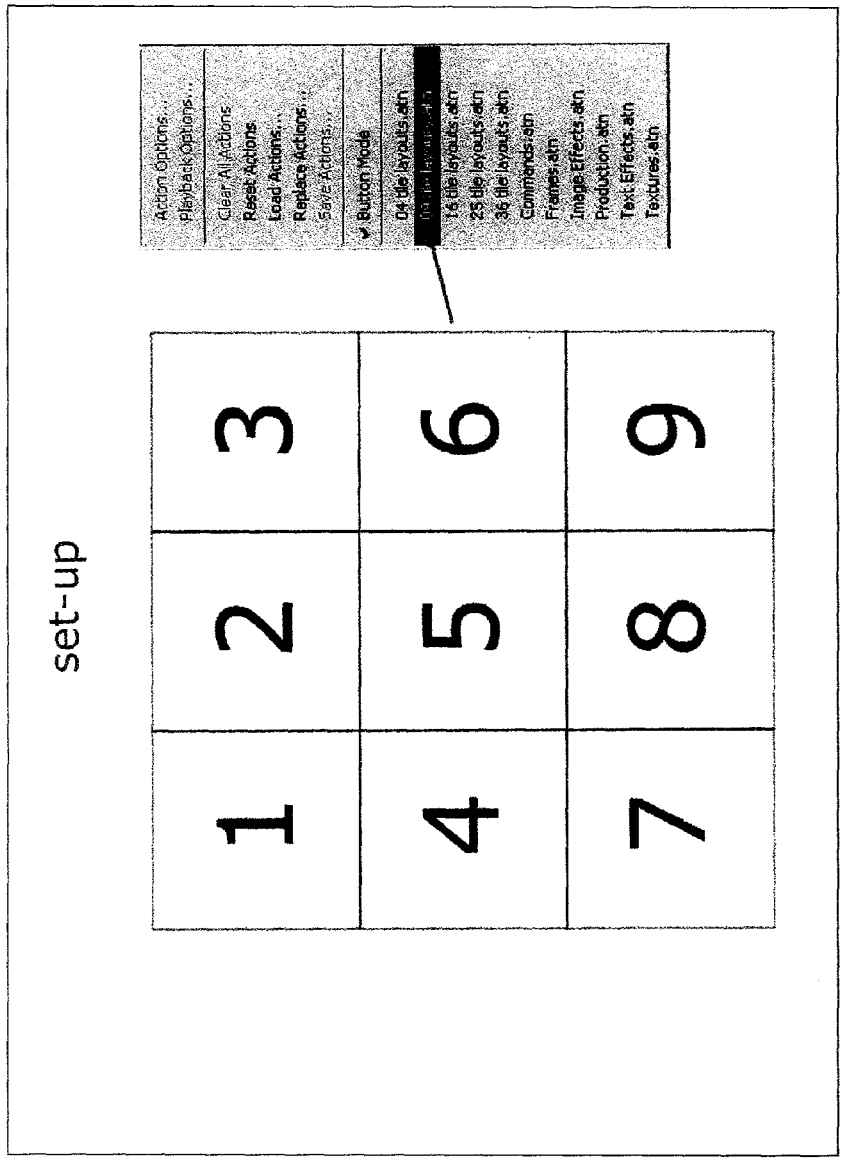
FIG. -8-

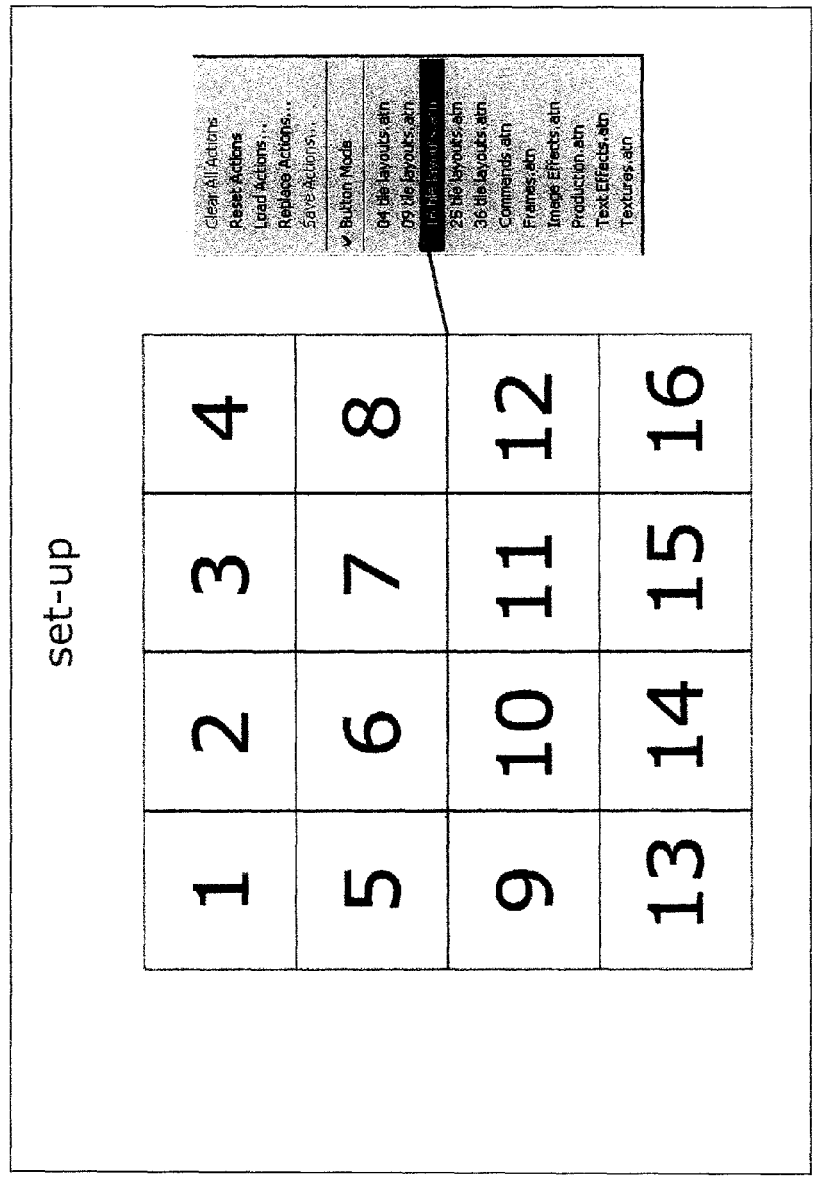
FIG. -9-

FIG. -10-

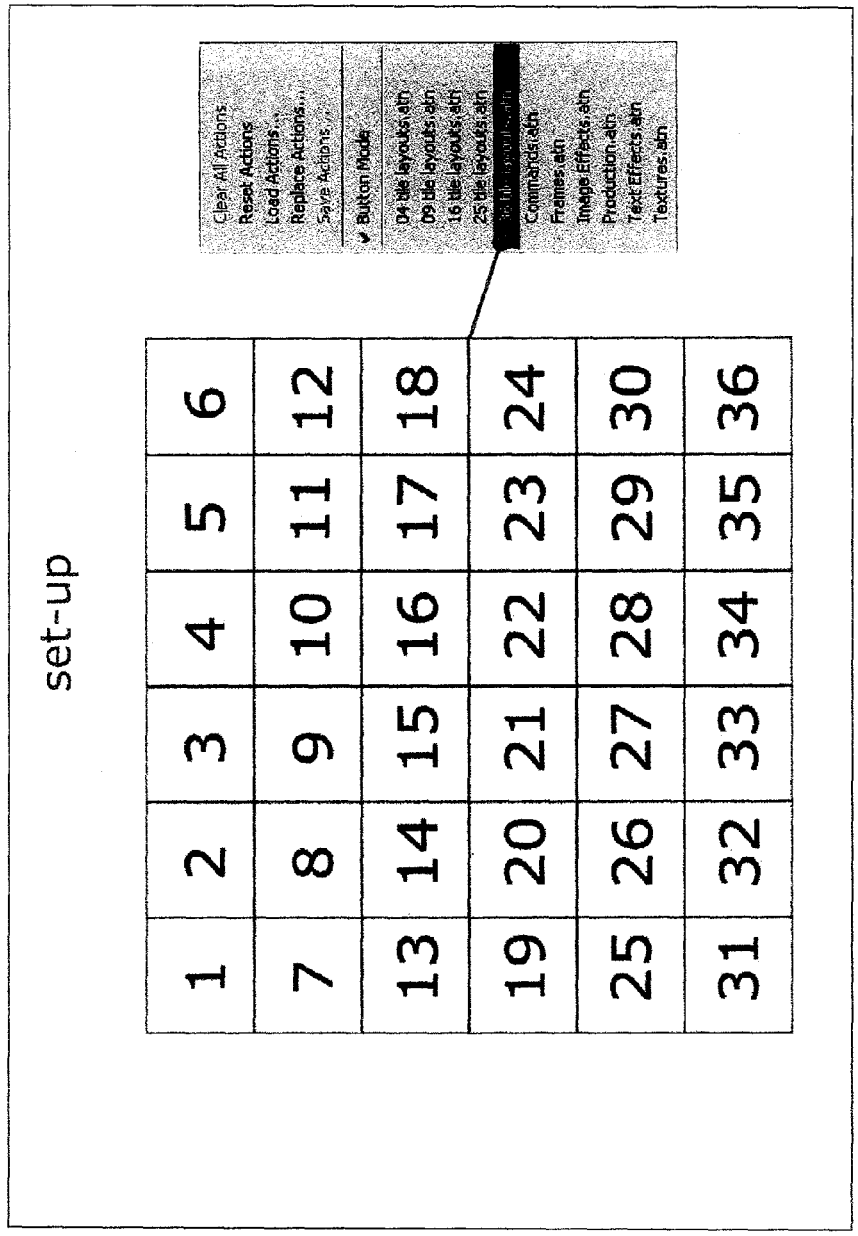
FIG. -11-

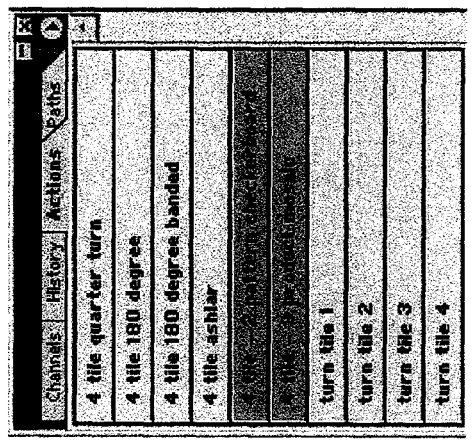
FIG. -12-

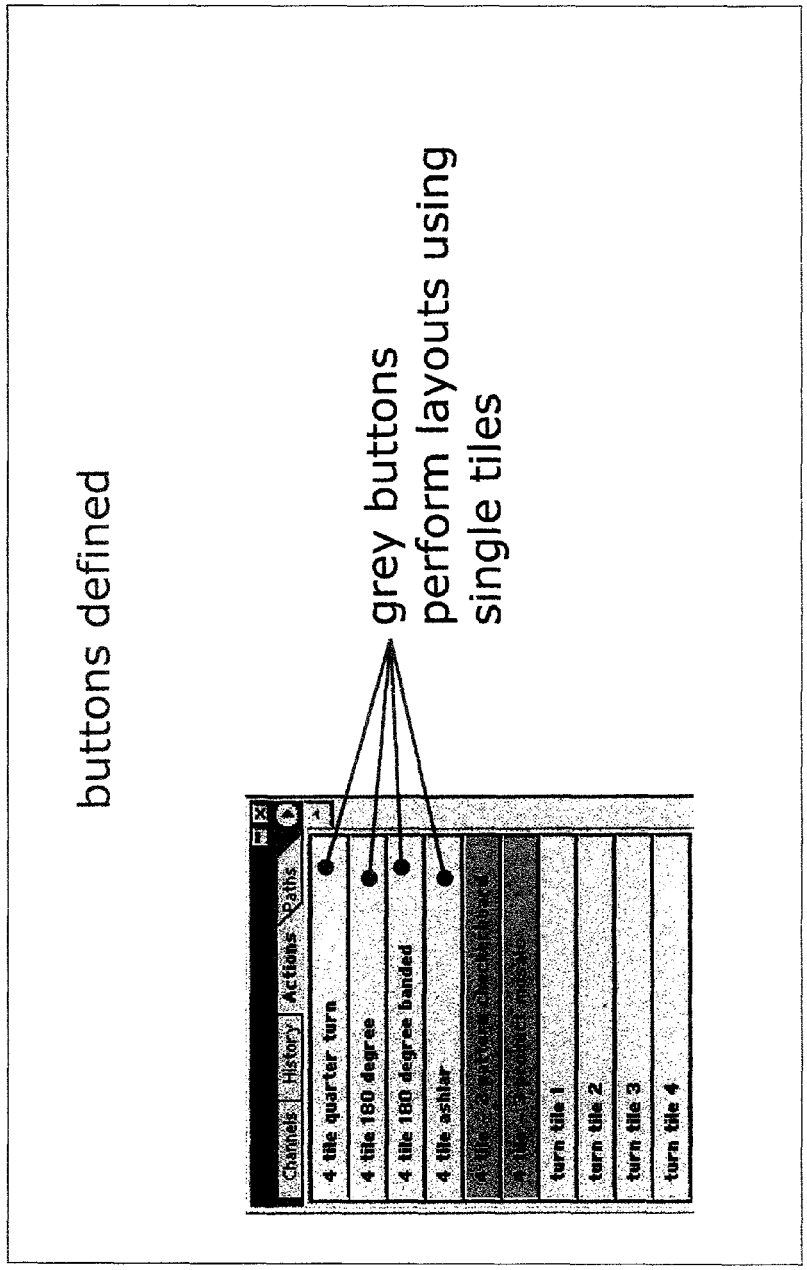
FIG. -13-

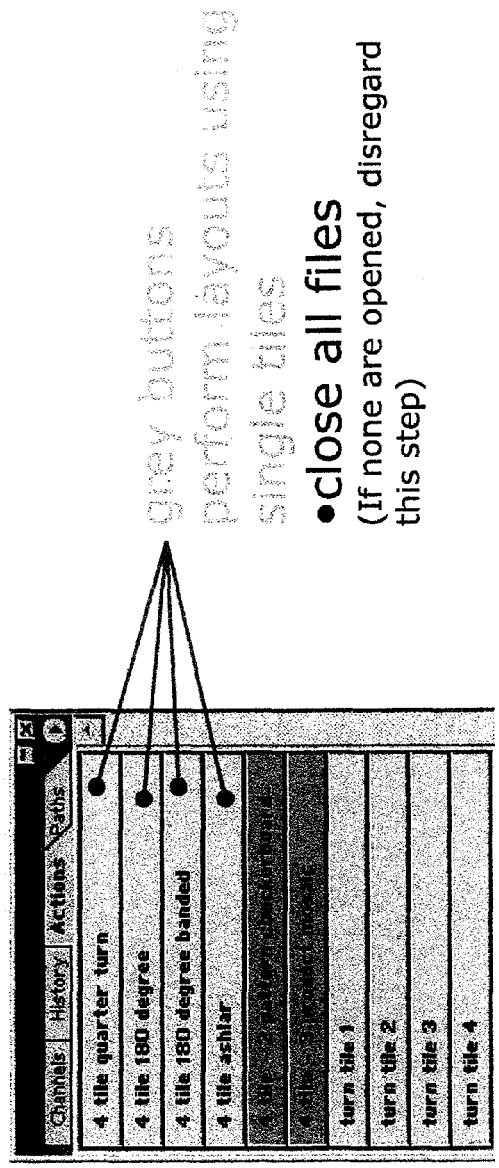
FIG. -14-

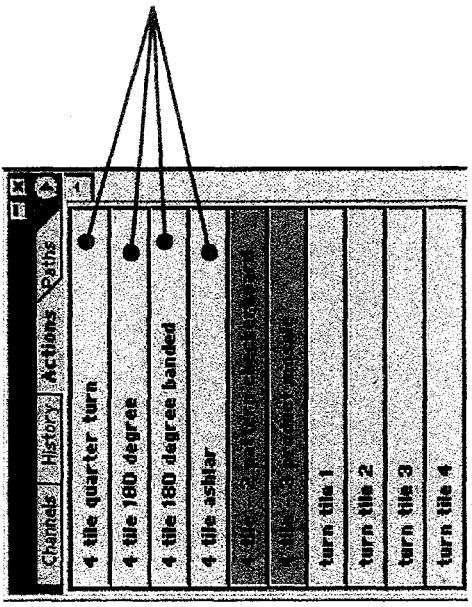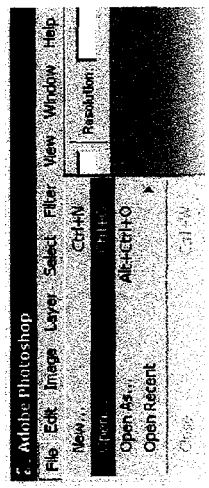
FIG. -15-

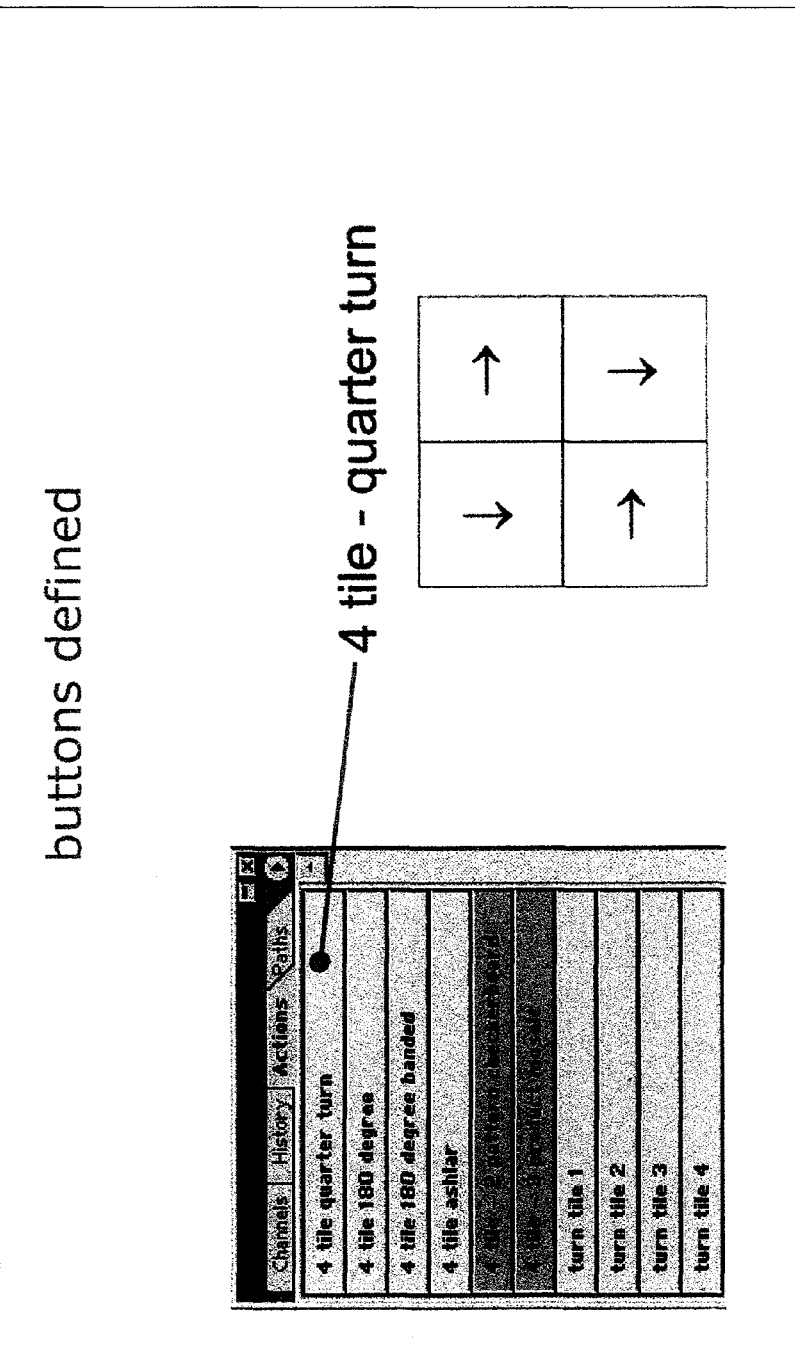
FIG. -16-

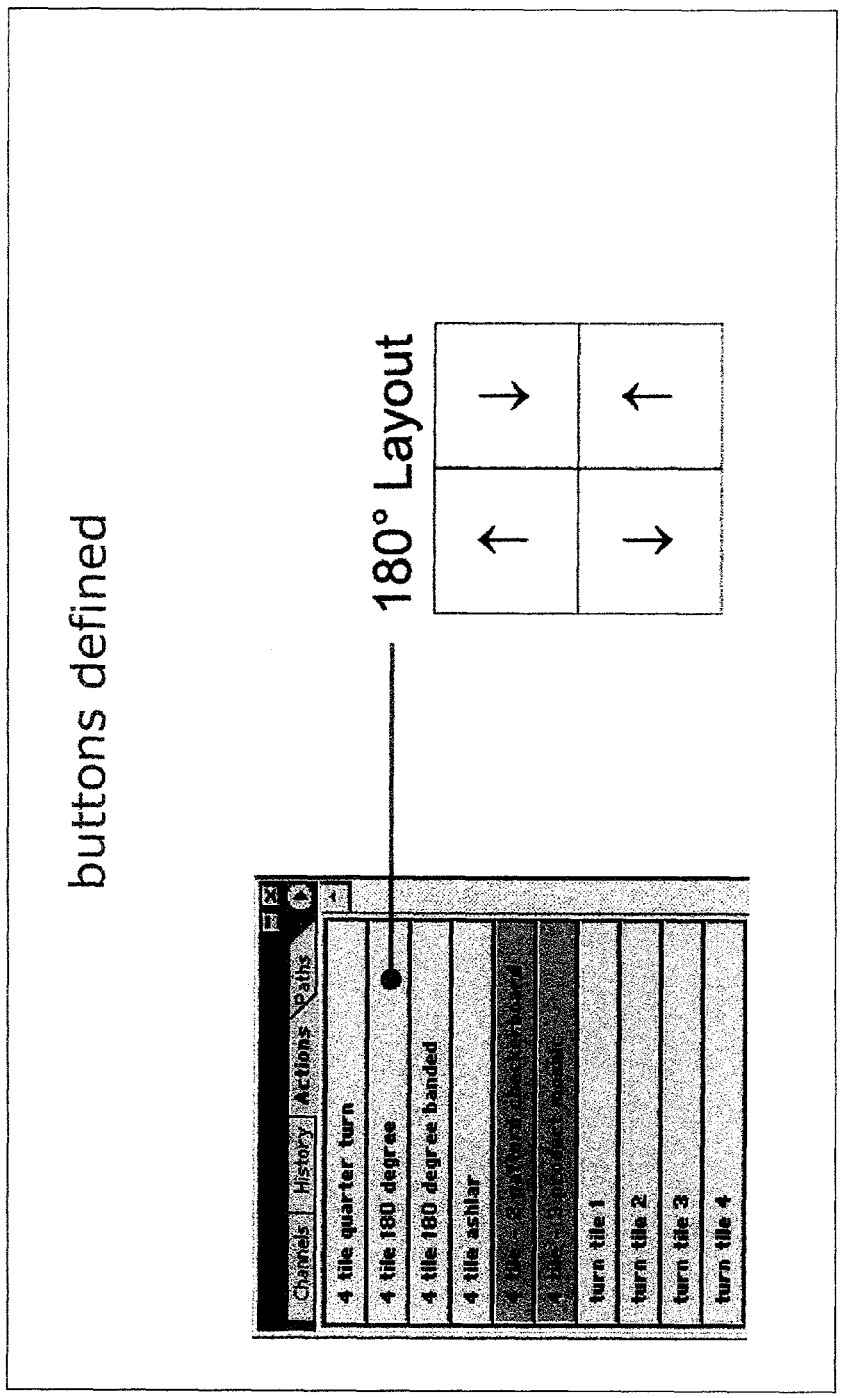
FIG. -17-

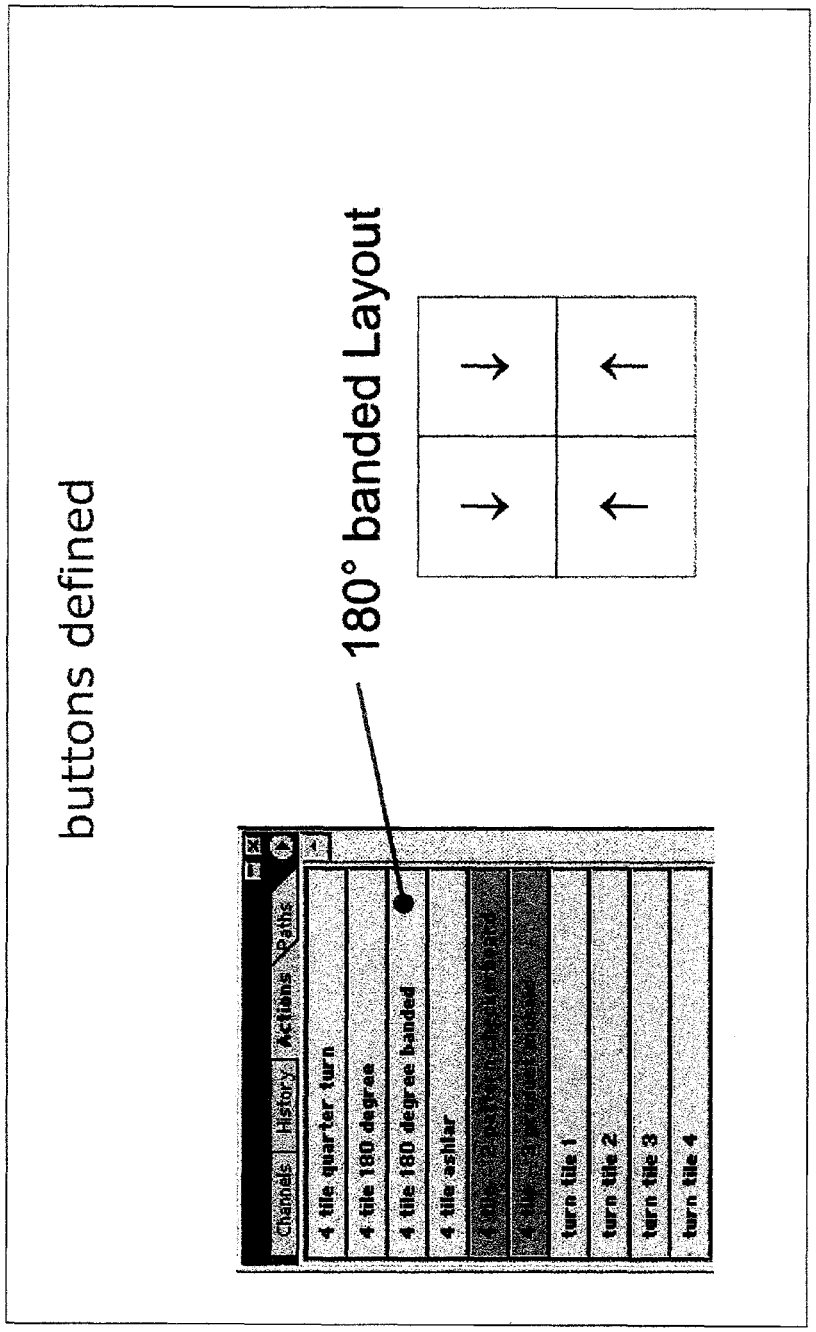
FIG. -18-

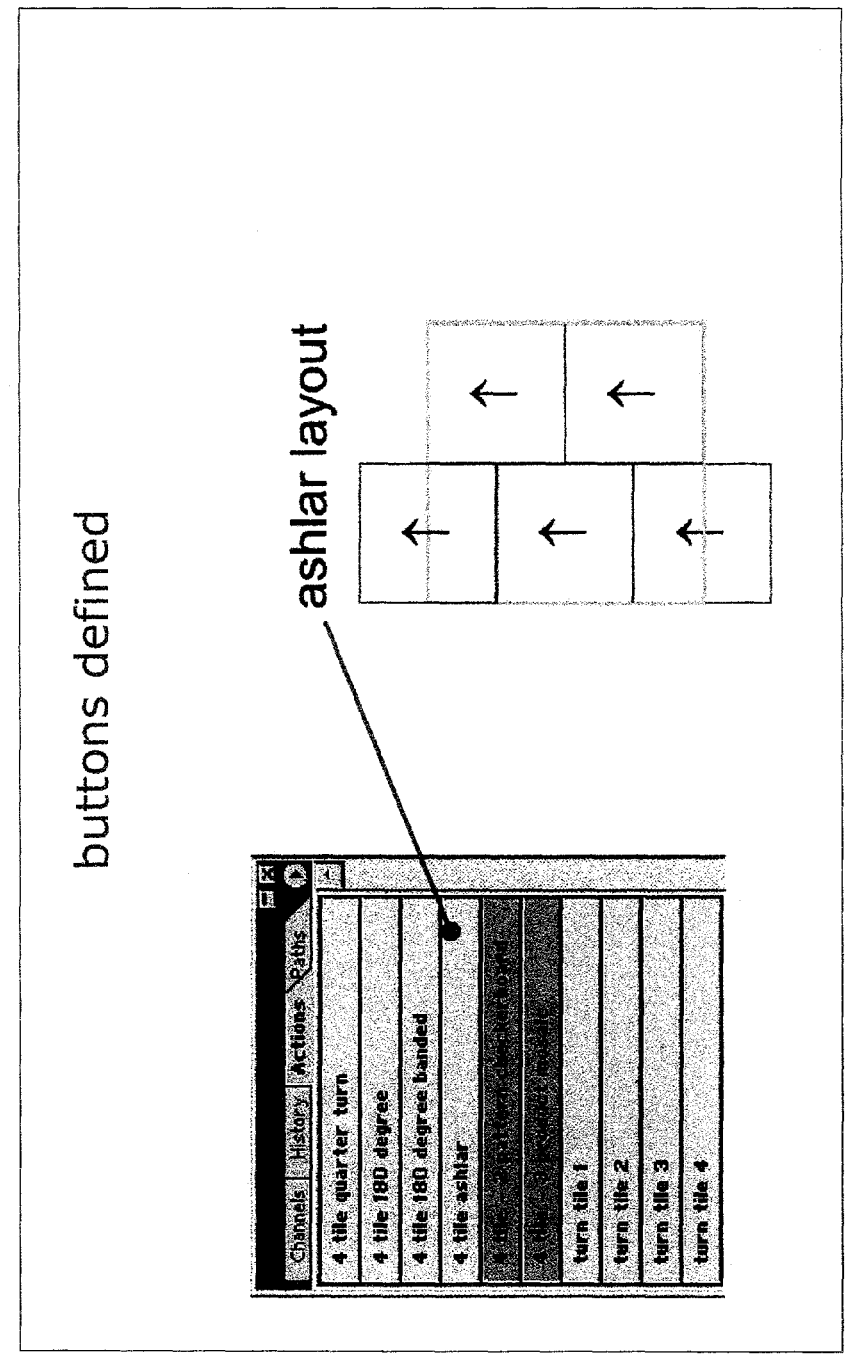
FIG. -19-

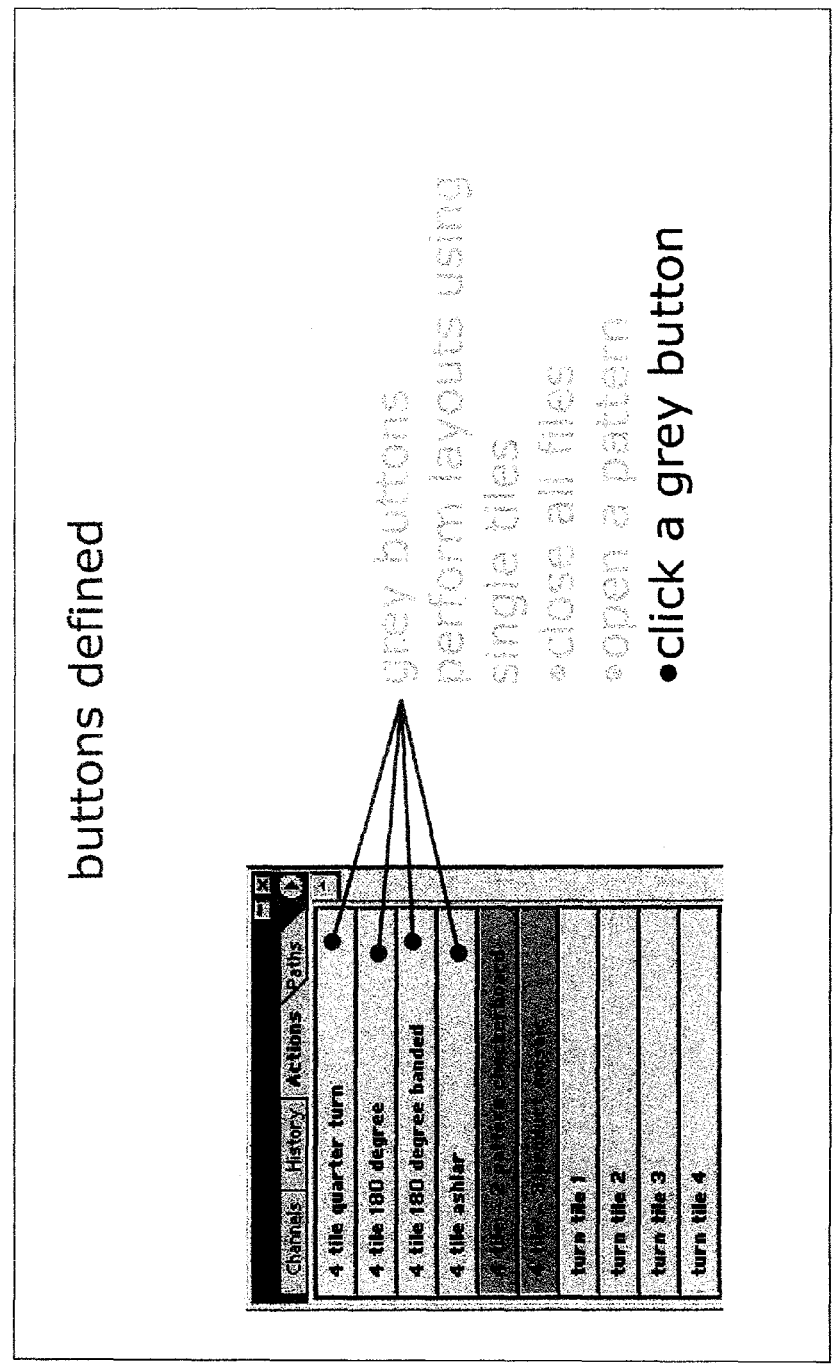
FIG. -20-

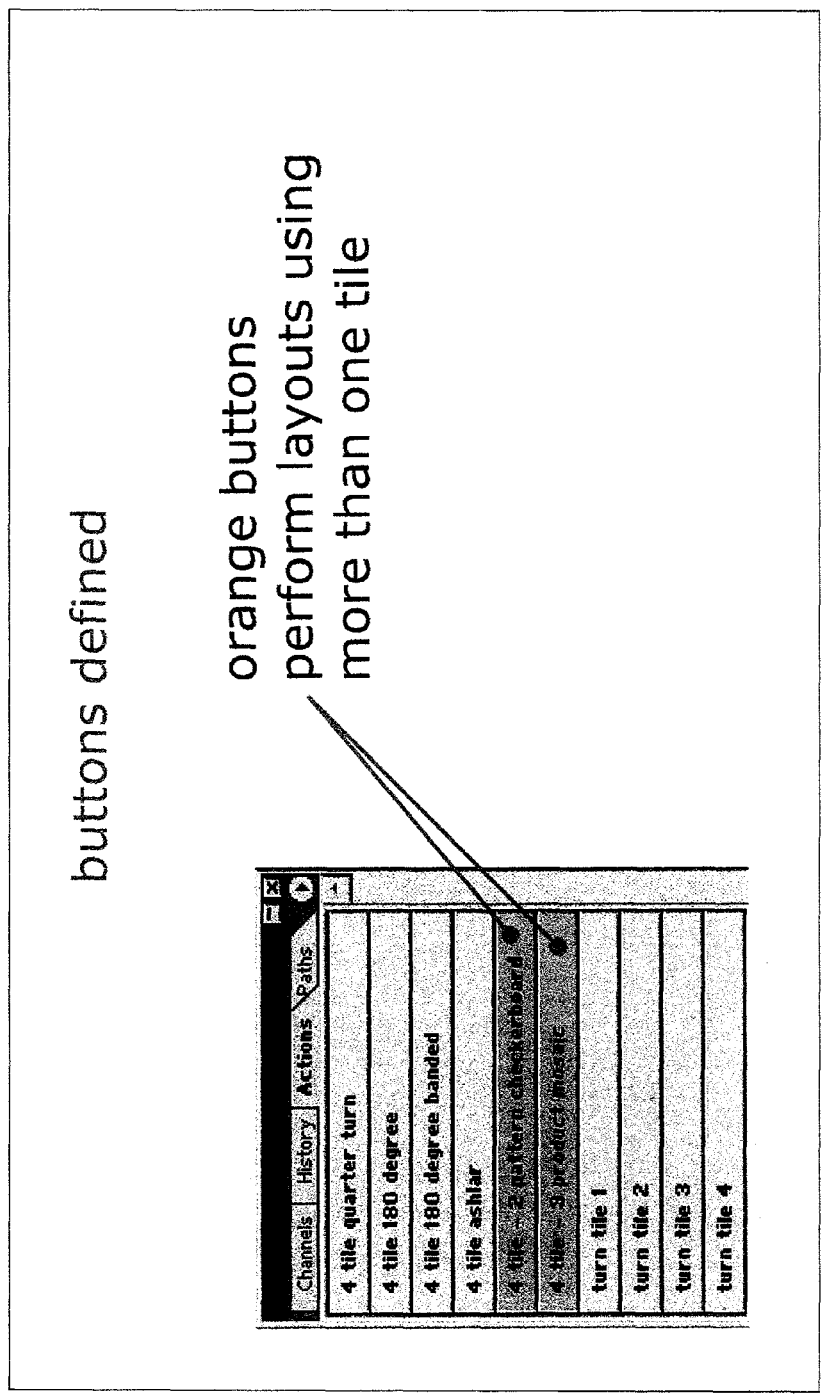
FIG. -21-

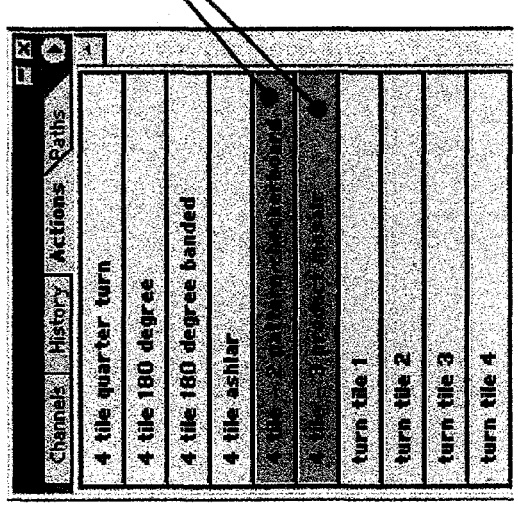
FIG. -22-

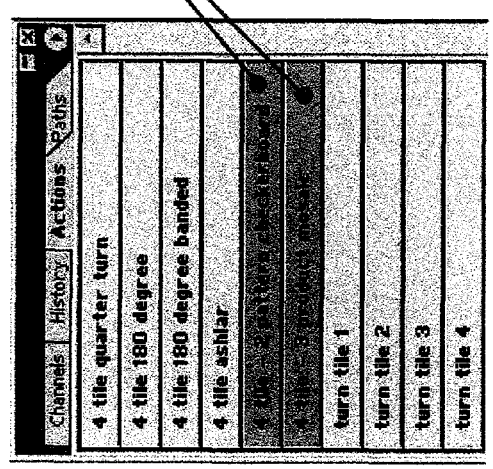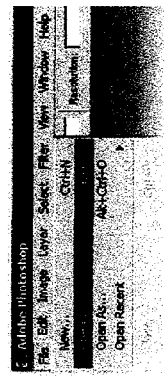
FIG. -23-

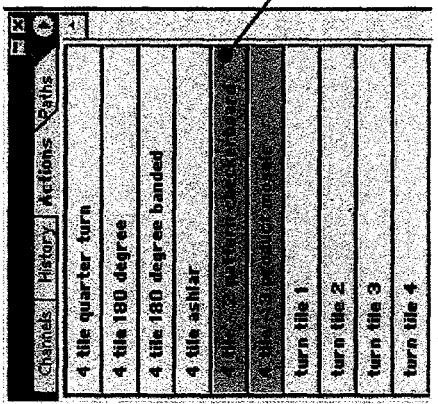
FIG. -24-

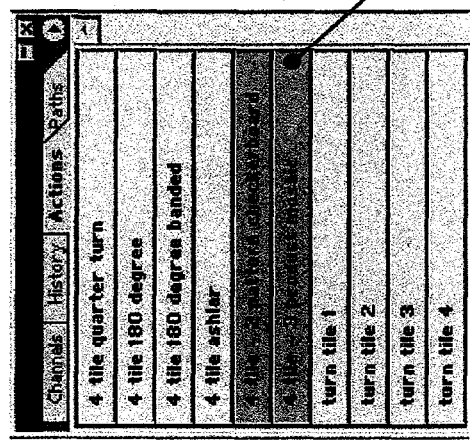
FIG. -25-

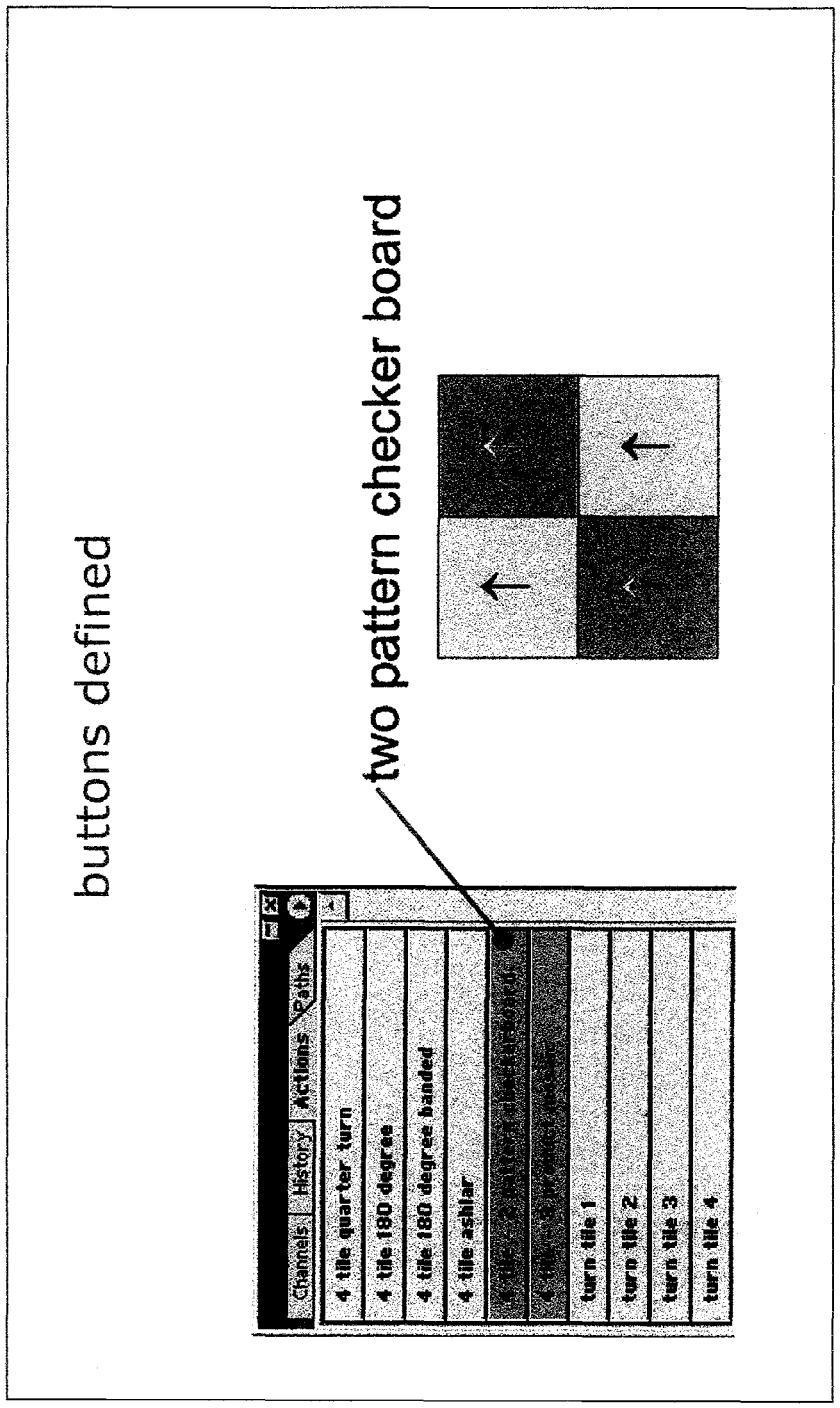
FIG. -26-

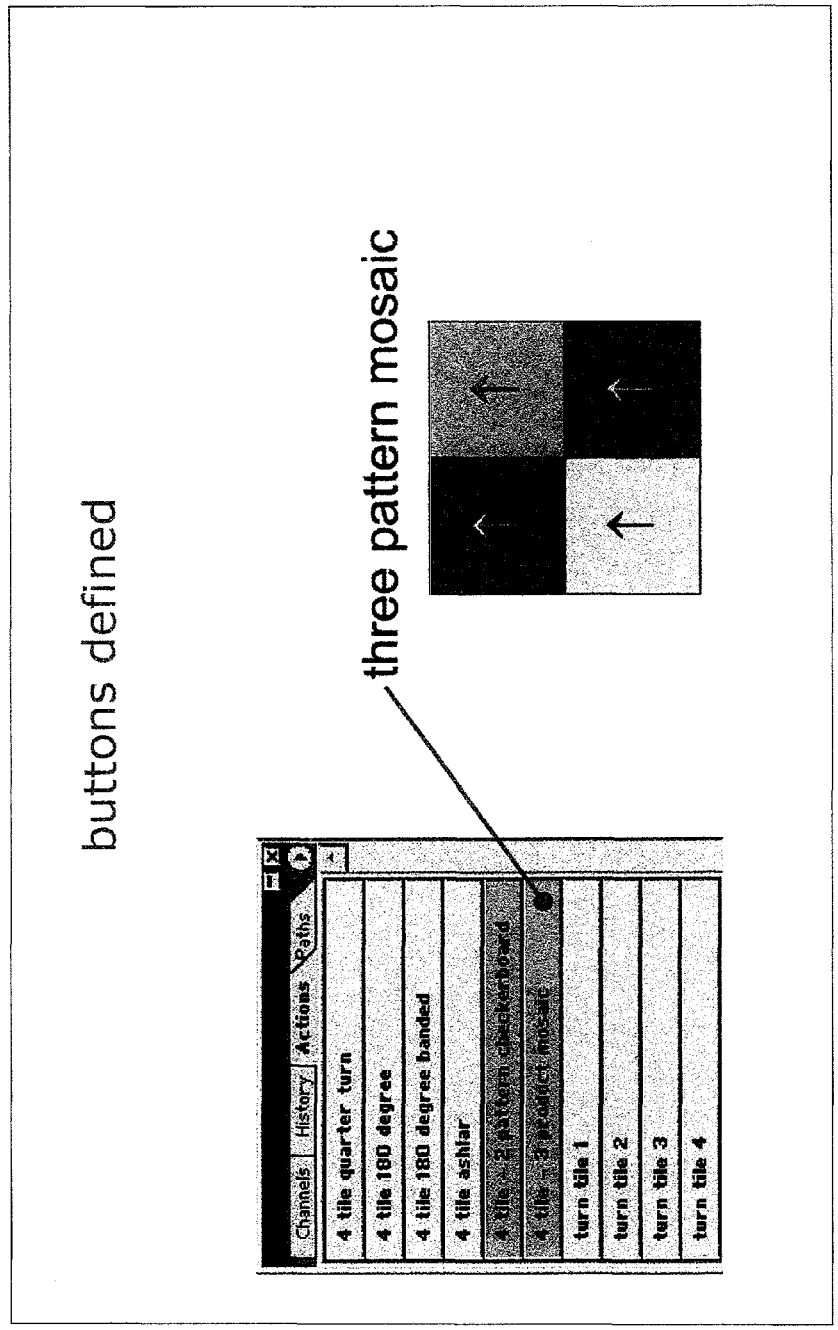
FIG. -27-

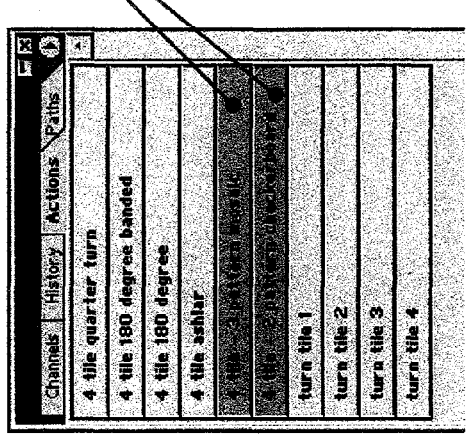
FIG. -28-

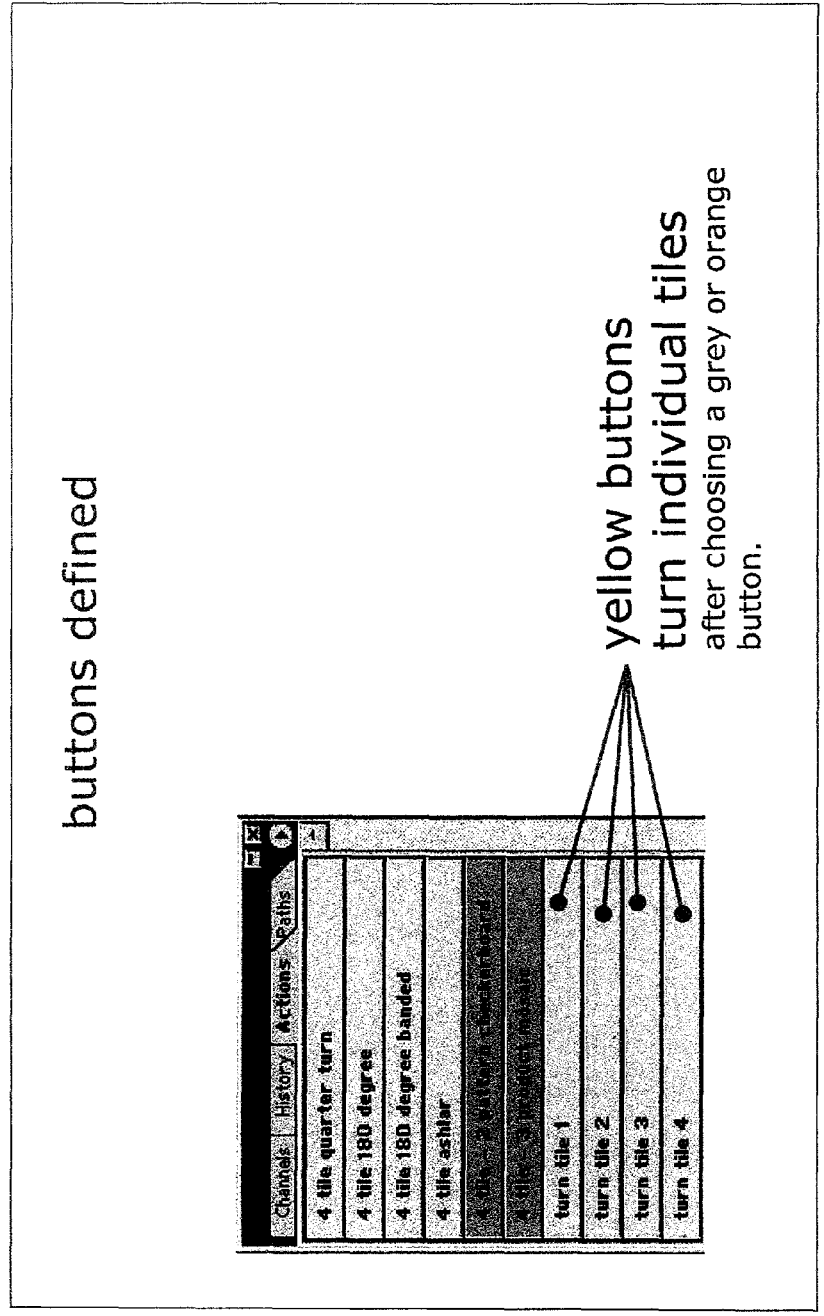
FIG. -29-

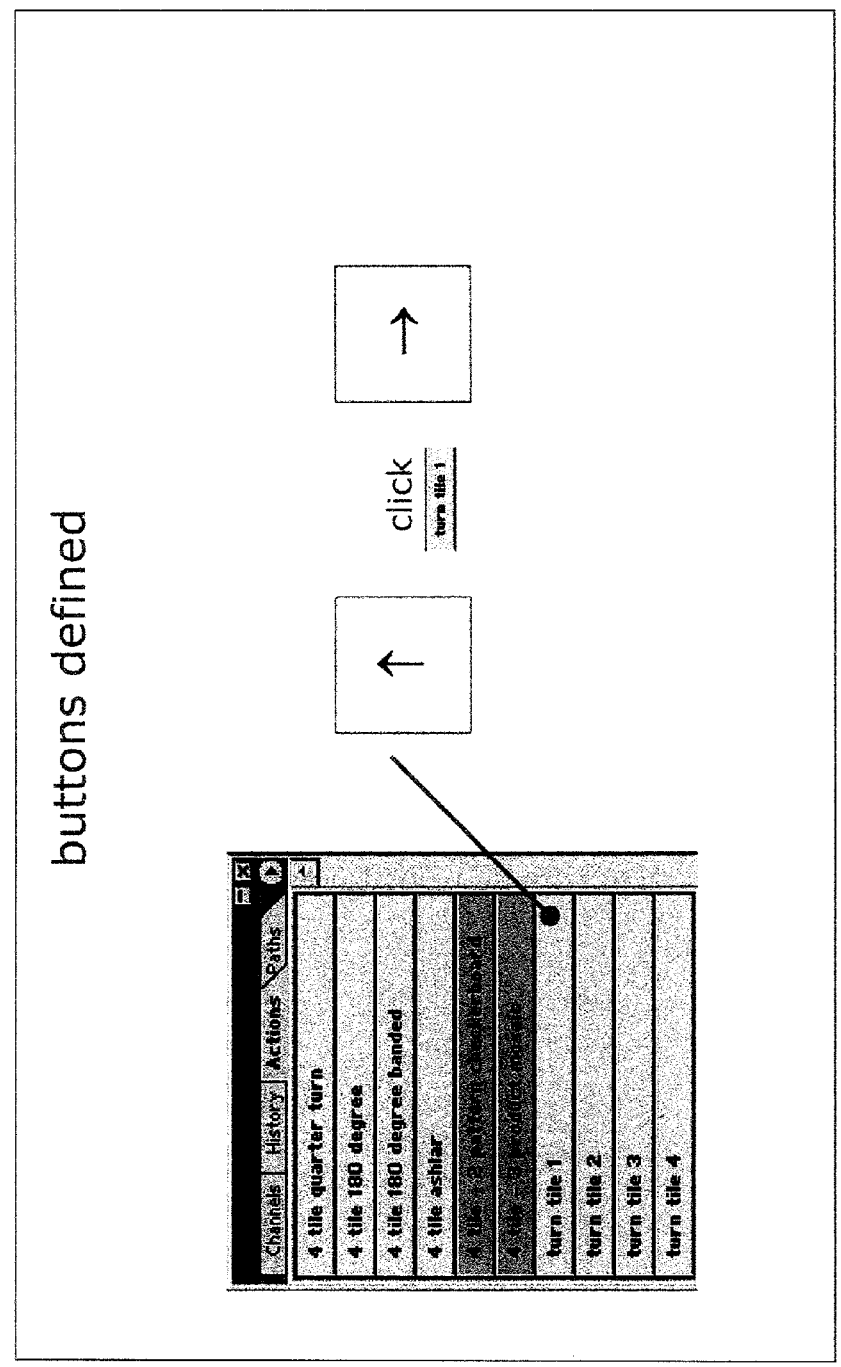
FIG. −30−

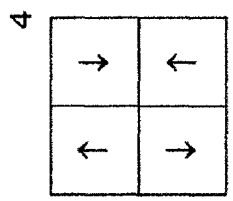
FIG. −31−

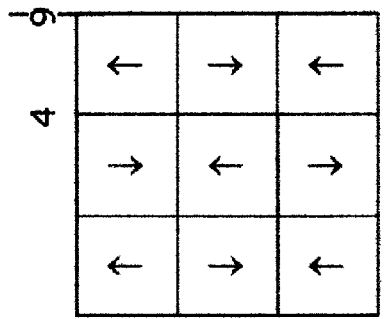
FIG. -32-

FIG. —33— layouts defined
25 tiles
180° Layout

FIG. -34- layouts defined
36 tiles
180° Layout

FIG. -35-

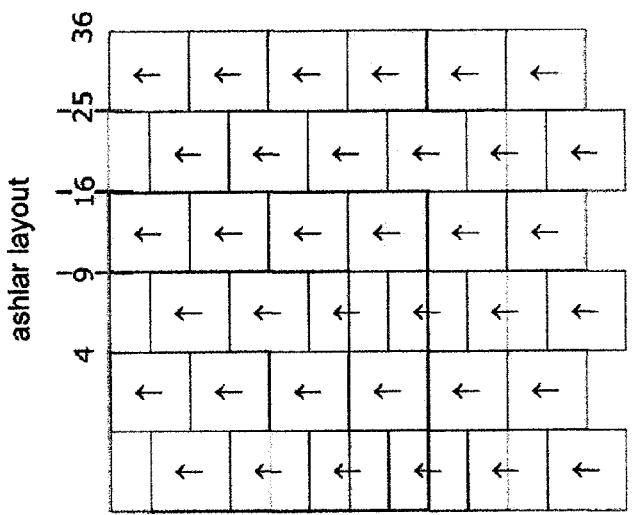
FIG. —36—

FIG. -37- layouts defined two pattern checkerboard Layout

FIG. -38-

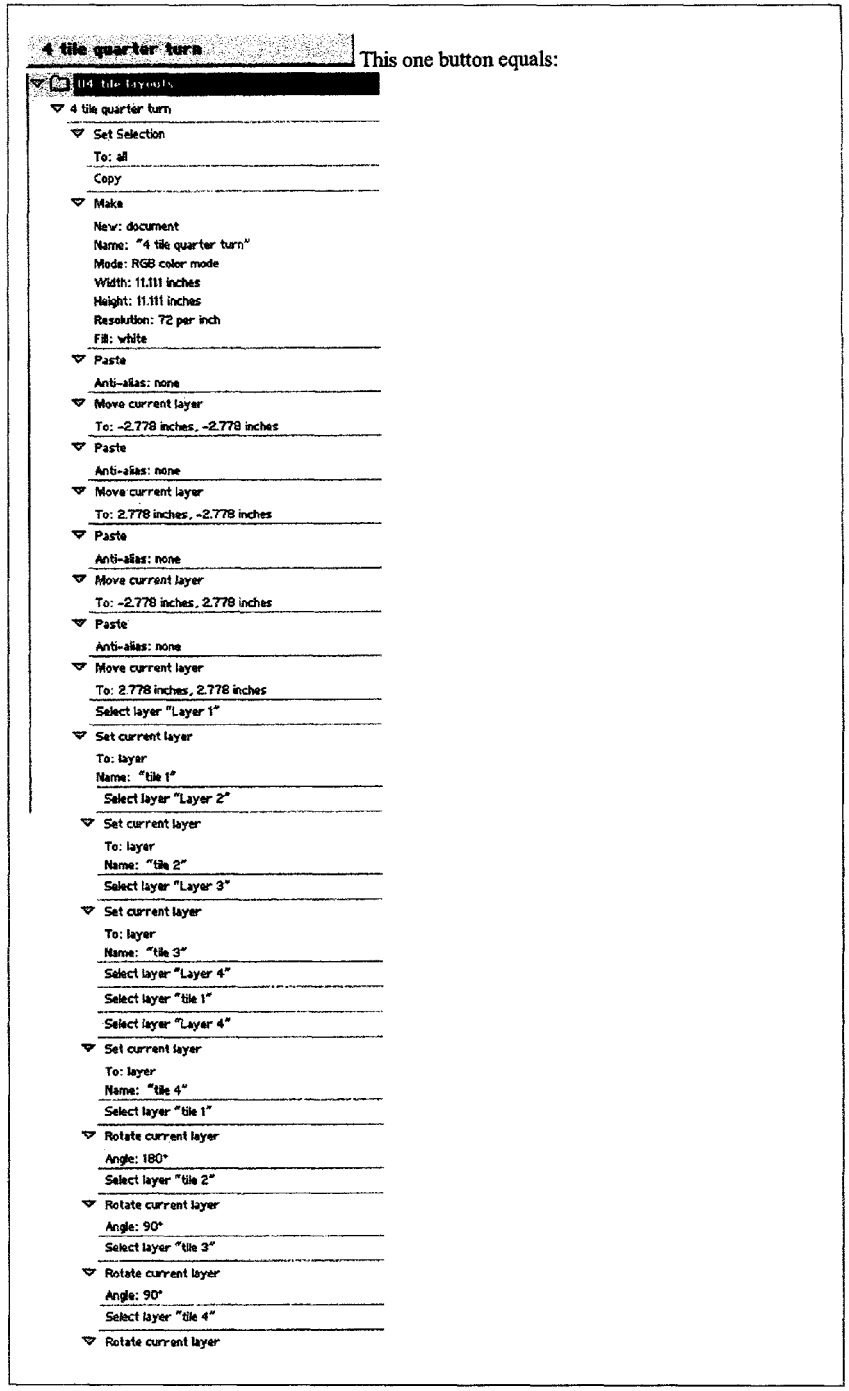
FIG. −39−

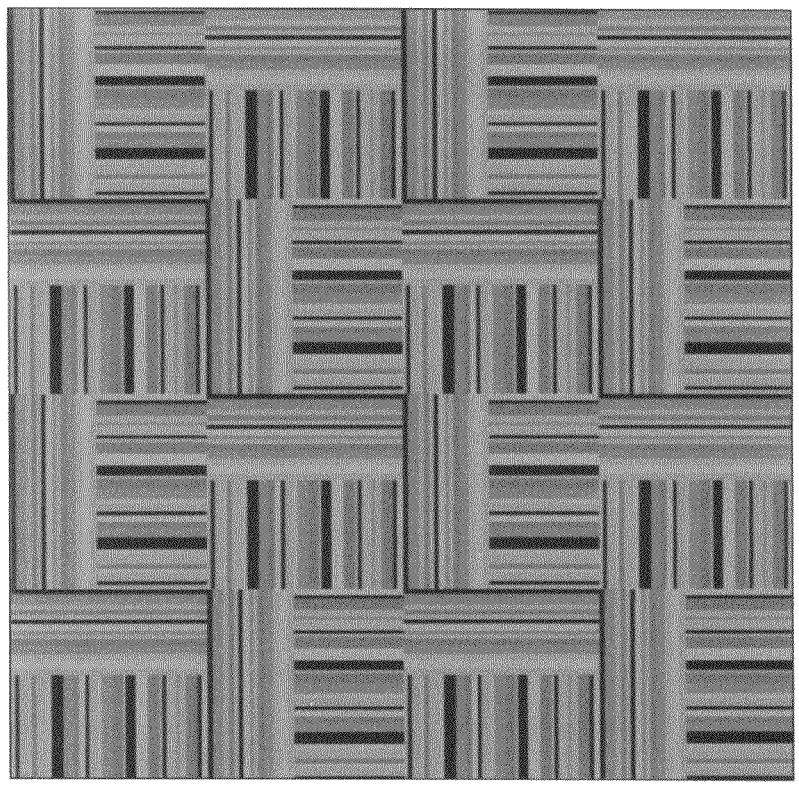
FIG. -40-

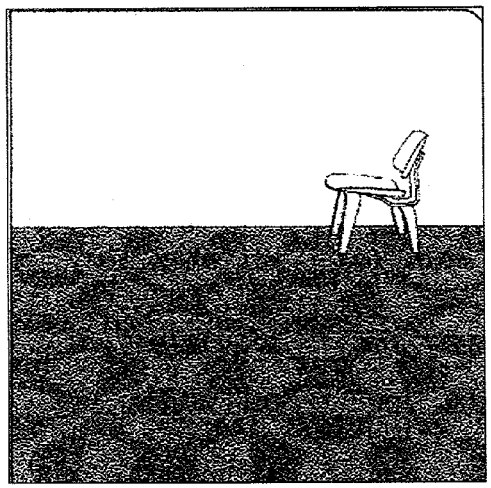
FIG. −41−

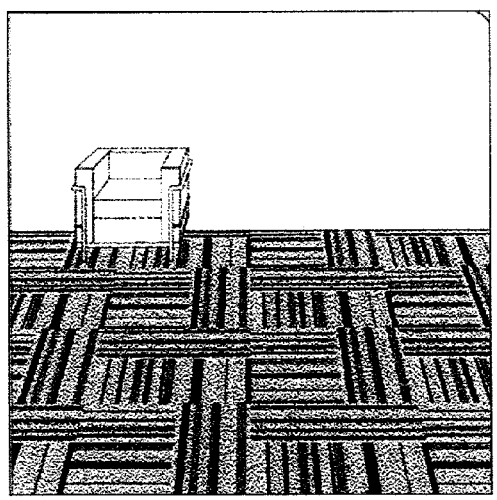
FIG. -42-

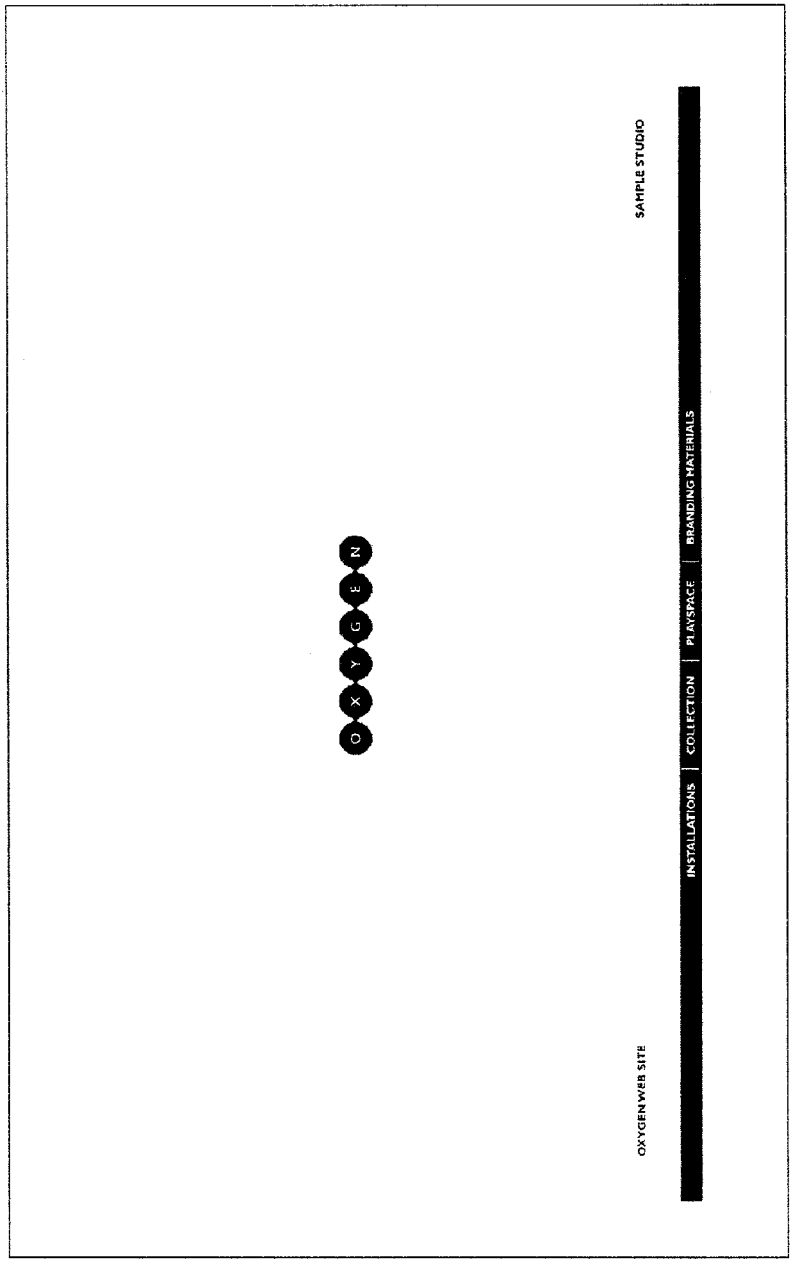
FIG. -43-

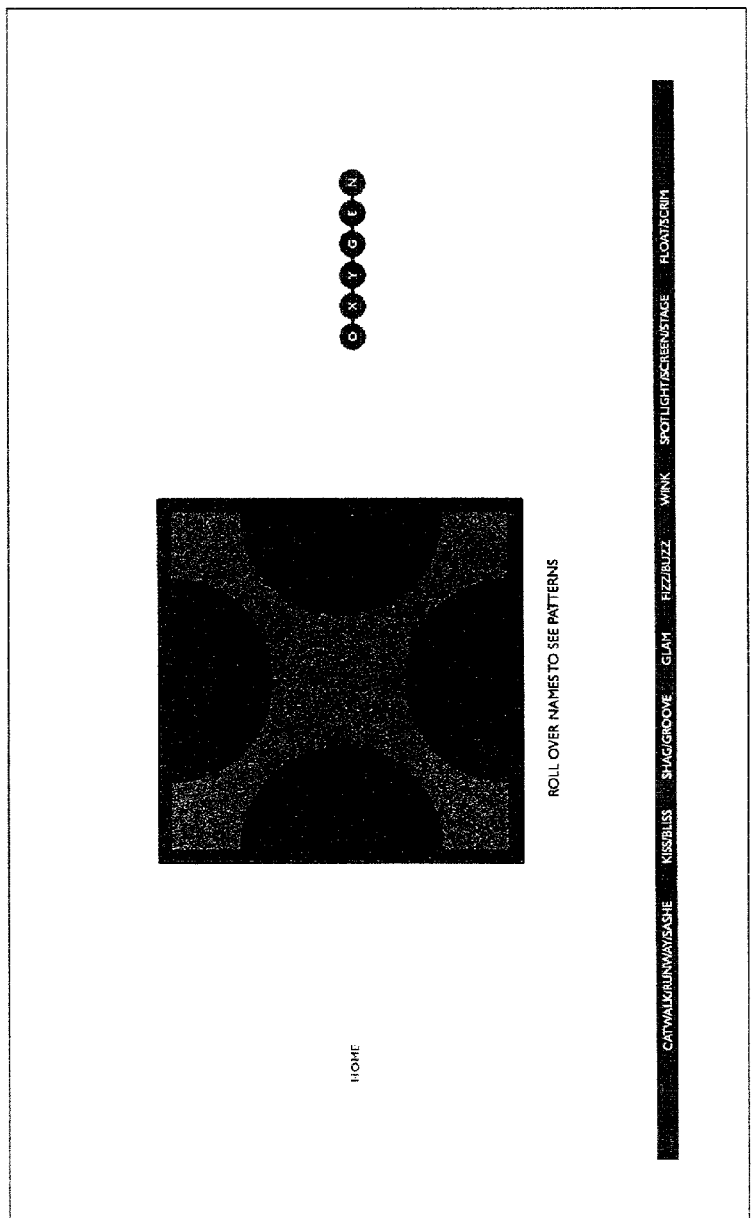
FIG. -44-

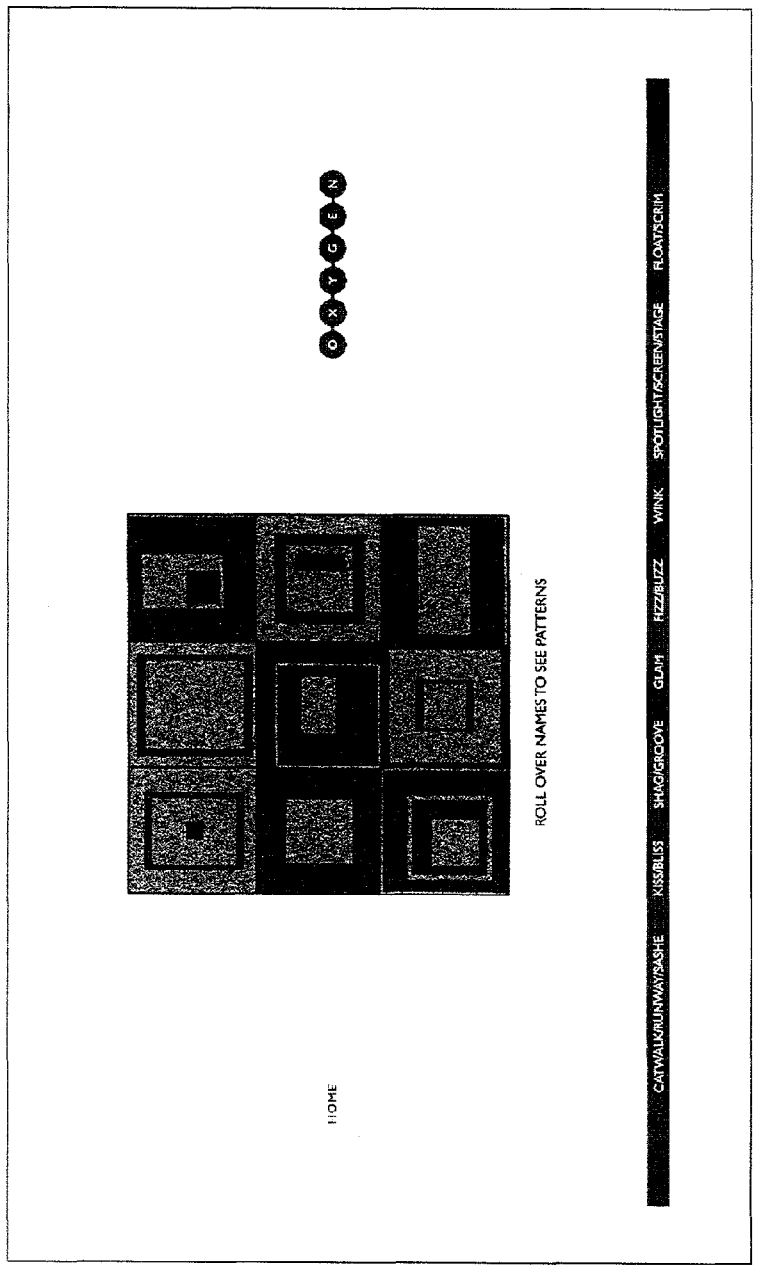
FIG. -45-

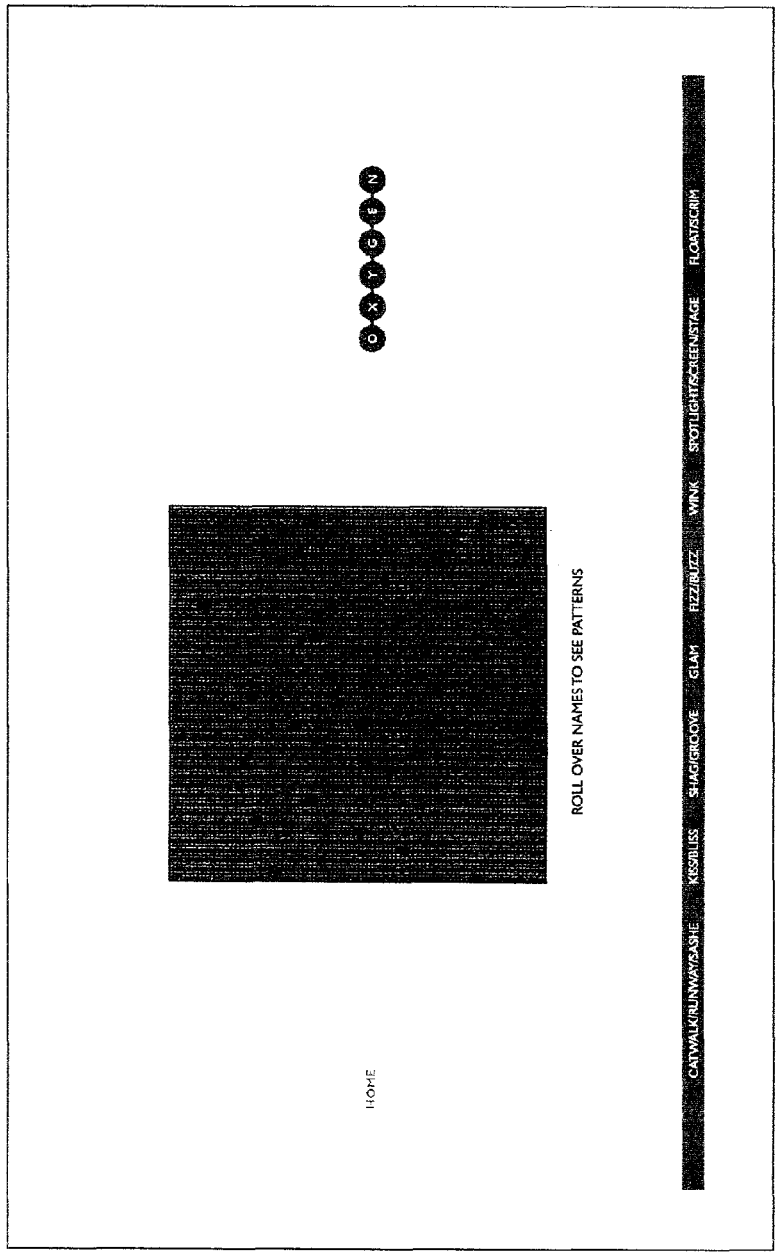
FIG. -46-

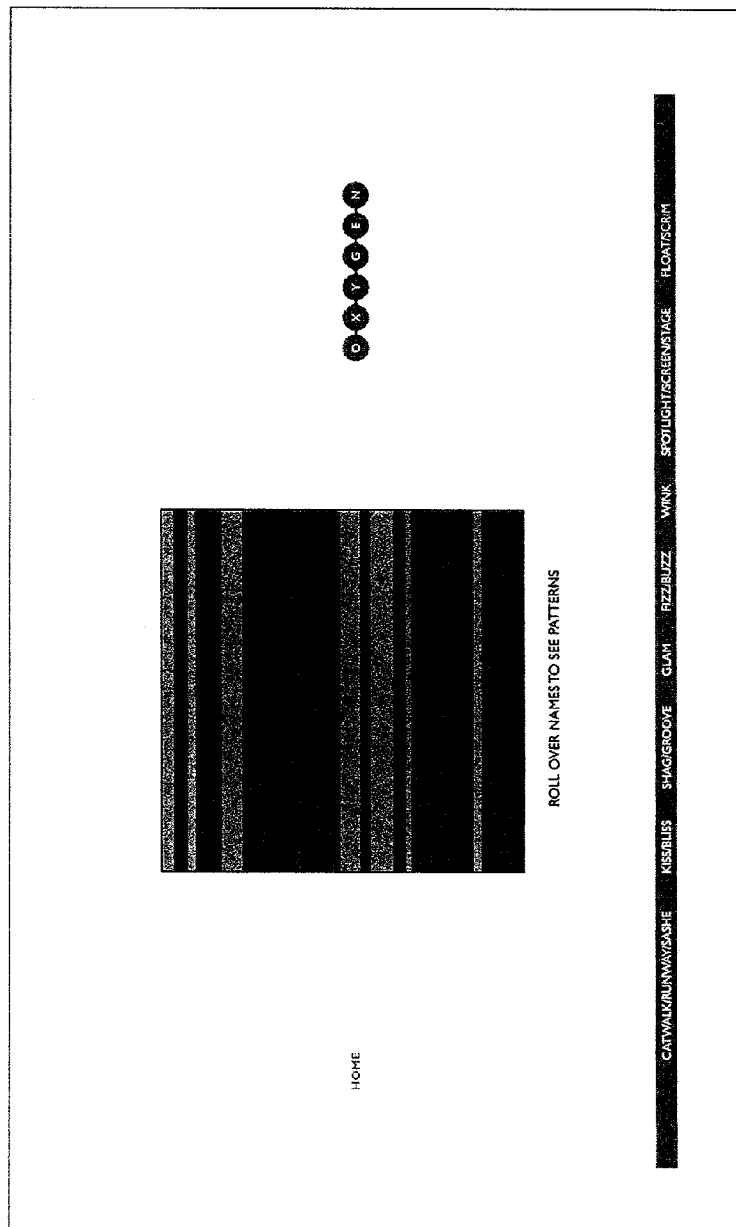
FIG. -47-

FIG. -48-

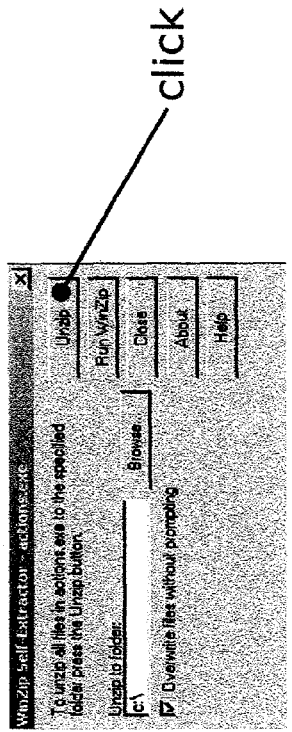
FIG. -49-

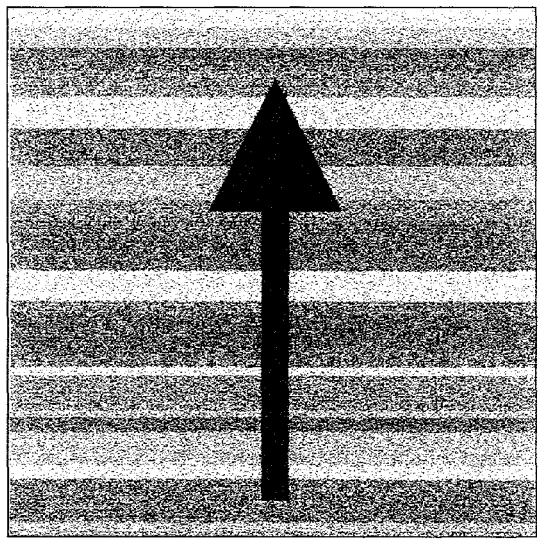
FIG. —50—

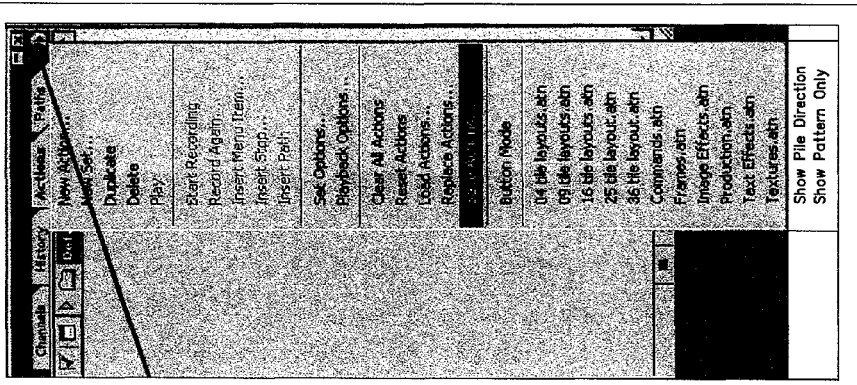
FIG. −51−

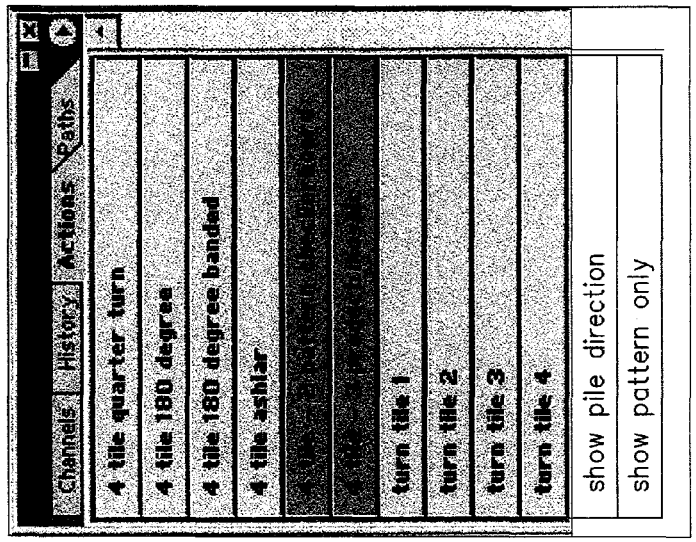
FIG. -52-

SYSTEMS AND METHODS FOR DISPLAYING AND MANIPULATING IMAGES OF FLOOR COVERING ELEMENTS

CROSS REFERENCE TO RELATED APPLICATIONS

This application claims the benefit of and priority to U.S. Provisional Patent Application Ser. No. 60/288,484, filed May 3, 2001, hereby incorporated by reference herein.

FIELD OF THE INVENTION

The present invention relates to a system, tool and/or method especially a computer based system, tool and/or method for the evaluation of pattern arrangements such as pattern carpet tiles. More particularly, the present invention is directed to a system, tool and/or method for presenting and manipulating a plurality of simulated elements incorporating patterns corresponding to patterns to be used on carpeting, carpet tiles, or other floor covering or surface covering elements. The simulated elements may be manipulated independently of one another to simulate various surface designs, layouts or arrangements of potential interest, for example, prior to ordering samples and/or the actual purchase or installation of the floor covering. The system, tool and/or method provides relatively easy manipulation and rearrangement of the simulated elements by a user of the system.

BACKGROUND OF THE INVENTION

Conventional evaluation of floor covering or flooring products such as carpeting, carpet tiles and area rugs involves a purchaser viewing samples (such as swatches), actual products, brochures, print outs, or other advertising showing products and patterns of interest and attempting to formulate a mental impression of how the floor covering will ultimately appear in an installed state within the final area of use (home, office, room, etc.).

This process may be further complicated in a large commercial installation such as may be present in office environments or expansive public facilities such as airports and the like wherein the floor covering is in the form of arranged patterned carpet tiles. In such installations, the carpet tiles are placed across the flooring surface in substantially adjacent relation to one another so as to appear as a substantially continuous patterned surface. Such installation techniques provide substantial flexibility in terms of developing a desired overall patterned arrangement across the flooring surface. In particular, the use of discrete tile elements permits a plurality of tiles having the same pattern to be arranged adjacent to one another in a so called "monolithic" installation procedure wherein every tile is arranged in a similar relative orientation. It is likewise possible to install the discrete tiles in an orientation wherein a portion of the tile elements are rotated 90, 180, or 270 degrees relative to the adjacent tiles so as to create a slightly different appearance while nonetheless using a single pattern.

It is also possible to offset adjacent rows of tiles to create a brick or ashlar look. Further, it is also possible to incorporate tiles with different surface designs in a single installation such that different designs are present at different locations within the installation. Such multi-patterned installations may utilize either "monolithic" or varying placement orientations in the installation process.

While the use of discrete tile products across a flooring surface provides the user with a number of potentially desirable installation options using either a single surface design pattern or multiple surface design patterns, it may be difficult for the user to visualize the coordinated arrangement of discrete elements or tiles prior to actual installation. While the use of physical samples of the floor covering material is generally useful, it may be difficult to visualize various combinations of different surface designs and/or placement orientations from such samples. Moreover, if multiple designs are contemplated, it may be time consuming and expensive to produce actual product samples for each contemplated design. Further, numerous actual 36 inch×36 inch full size carpet tile samples may be heavy, bulky and cumbersome to transport to or from the customer and difficult for customers to manipulate. Finally, typical floor covering products or samples are not configured for mounting on a common support surface for manipulation and evaluation of different designs and/or orientation combinations.

Still further, pattern carpet or carpet tile having unique designs, patterns, color combinations, textures, and/or the like provides for aesthetically pleasing flooring, but as contrasted to solid color carpet provides a challenge in visualizing how the pattern carpet or carpet tile will look installed in a room, home, office, or the like. For example, Milliken & Company of LaGrange, Georgia produces Comfort Plus® jet dyed pattern carpet tile having aesthetically pleasing unique designs, colors, textures, and the like.

Hence, there is a need for an improved system, tool, and/or method for evaluating potential floor covering pattern arrangements or installations prior to the floor covering products actually being purchased or installed.

SUMMARY OF THE INVENTION

At least one embodiment of the present invention provides advantages and/or alternatives over the prior art by providing a system, method and/or tool whereby a user such as a prospective purchaser of floor coverings or other surface coverings may engage in the contemporaneous manipulation and evaluation of various combinations of surface patterns and/or placement orientations for floor covering elements prior to ordering samples and/or actual purchase or installation.

According to one embodiment of the present invention, a computer system or tool for simulating a floor covering pattern arrangement or installation is provided. The computer system includes a personal computer (including a processor, a display or monitor and a user interface (keyboard and/or a mouse)), a lap top computer, or other video terminal having access to a database of a multiplicity of patterned simulated floor covering elements substantially corresponding to commercially available carpet or other floor covering tiles such as carpet tiles, ceramic tiles, or the like to be used in the proposed installation thereby substantially simulating such floor covering tiles. The manipulatable patterned elements include surface designs, patterns, colors, textures, and/or the like substantially corresponding to available surface designs of floor covering elements for potential use in the actual installation. The size and shape of the design elements in the surface designs across the simulated elements substantially correspond to the design or pattern on and the size and shape of the actual floor covering tiles in terms of relative size and shape such that the simulated tile elements appear as substantially complete but reduced versions of the patterns across the actual floor covering tiles. At least a portion of the manipulatable simulated elements may have surface designs, patterns, and/or colors different from other of the simulated elements.

The computer system also includes software, tools, plug-ins, and/or the like that allow the user to selectively manipulate and view the simulated tile elements in selected pattern arrangements or orientations on the CRT display or computer monitor. The simulated tile elements may thereby be arranged, rearranged, and viewed in a patterned arrangement substantially corresponding to proposed arrangements of floor covering elements across an underlying flooring surface in the proposed floor covering installation.

According to another aspect of the invention, an automated system, tool or method of manipulating simulated floor covering elements such as carpet tiles incorporating designs substantially corresponding to designs present across floor covering elements of possible interest to a purchaser is provided. The simulated floor covering elements have an upper surface design corresponding substantially to an available surface design for a carpet, carpet tile, or other floor covering product. The simulated floor covering elements can be viewed in top view or perspective view (such as in a room scene) so as to simulate disposition of floor covering elements across a flooring surface. The simulated floor covering elements may be placed in various arrangements corresponding to potentially desired floor covering arrangements in a floor covering installation and thereafter may be manipulated to yield various alternative arrangements for substantially contemporaneous evaluation of multiple prospective designs and/or installation arrangements. The selected arrangements or views of simulated floor covering elements such as a layout of carpet tiles may be viewed, edited, stored, and/or printed out. Also, once a user has selected the desired floor covering product layout or arrangement, the floor covering samples and/or products may be ordered.

According to another aspect of the present invention, a method of generating a simulated surface covering or floor covering installation is provided. In accordance with the method, one or more surface patterns corresponding substantially to surface patterns for available floor covering products are provided as a plurality of manipulatable simulated elements such that each simulated element has a patterned design substantially corresponding to a patterned design present on an actual carpet tile or other floor covering element of interest to a user. The simulated elements are selectively arranged in a layout or arrangement substantially corresponding to a prospective arrangement of actual floor covering tile elements across a flooring surface. The simulated elements may thereafter be rearranged in one or more alternative layouts or arrangements to simulate other prospective installation arrangements.

BRIEF DESCRIPTION OF THE DRAWINGS

The accompanying drawings which are incorporated in and which constitute a part of this specification illustrate certain exemplary and potentially preferred embodiments of the invention and, together with the general description of the invention given above, and the detailed description set forth below, serve to explain the principles of the invention wherein:

FIGS. 1-38 are sequential schematic representations of pages or screen displays of an instruction manual, video, tutorial, presentation, or the like in accordance with one embodiment or example of the system, tool and/or method of the present invention.

FIG. 1 instructs the user to launch ADOBE PHOTOSHOP 6.0™.

FIG. 2 instructs the user to make sure the actions window is visible.

FIG. 3 instructs the user to save all actions that may have been created.

FIG. 4 instructs the user to clear all actions.

FIG. 5 instructs the user to set the actions to button mode.

FIG. 6 instructs the user to load the layout that they wish to work with.

FIGS. 7-11 show respective 4, 9, 16, 25, and 36 tile layouts with each tile position numbered.

FIG. 12 shows the user the action buttons (actions) in accordance with at least one example or embodiment of the present invention.

FIG. 13 instructs the user that the first four (grey) buttons perform layout functions or actions using single tiles.

FIG. 14 instructs the user to close all files.

FIG. 15 instructs the user to open a pattern.

FIGS. 16-19 show respective 4 tile quarter turn layout, 180° layout, 180° banded layout and ashlar (or brick) layout.

FIG. 20 instructs the user to click a grey button (activate a functionality or tool).

FIG. 21 instructs the user that the fifth and sixth (orange) buttons perform layouts using more than one tile.

FIG. 22 instructs the user to close all files.

FIG. 23 instructs the user to open a first pattern (tile position 1).

FIG. 24 instructs the user to open a second pattern (tile position 2).

FIG. 25 instructs the user to open a third pattern if choosing a 3 pattern mosaic.

FIGS. 26 and 27 show respective two pattern checkerboard and three pattern mosaic layouts.

FIG. 28 instructs the user to click an orange button.

FIG. 29 instructs the user that the seventh-tenth (yellow) buttons turn individual tiles after choosing a grey or orange button.

FIG. 30 instructs the user that clicking the turn tile 1 button turns tile 190° clockwise.

FIGS. 31-35 show respective exemplary 4 tile, 9 tile, 16 tile, 25 tile, and 36 tile 180° layouts.

FIGS. 36-38 show respective exemplary 36 tile ashlar (or brick), two pattern checkerboard, and three pattern mosaic layouts.

FIG. 39 is a schematic representation of the process steps involved in the 4 tile quarter turn button or action.

FIG. 40 is a schematic top view representation of a selected 16 element or tile quarter turn layout of a single pattern.

FIGS. 41 and 42 are schematic perspective room scene views of selected patterned element layouts or arrangements.

FIGS. 43-48 are schematic representations of respective web pages or screen displays showing the OXYGEN™ product line, selected floor covering element designs or patterns (FIGS. 44-47), and instructions for downloading the OXYGEN PLAYSPACE™ actions (functionalities, plug-ins).

FIG. 49 is a schematic representation of a page or screen display of an instruction manual, video, tutorial, presentation, or the like with one embodiment or example of instructions for installation of the actions into ADOBE PHOTOSHOP 6.0.™

FIG. 50 is a schematic top view representation of a process or pile direction (or tile orientation) arrow over a pattern or design (simulated element).

FIGS. 51 and 52 are schematic representations of respective embodiments or examples of Pile Direction and Pattern Only buttons shown in pages or screen displays of an instruction manual, video, tutorial, presentation, or the like.

While the invention has been illustrated and will be hereinafter described in relation to certain potentially preferred embodiments, practices and procedures, is to be understood that the invention is in no way to be construed as limited to such embodiments, practices or procedures. To the contrary, it is anticipated that modifications may be made and that other embodiments of the principles of the invention may occur to those skilled in the art to which this invention pertains. Therefore, it is the intent of the applicants to cover all such modifications and embodiments as may incorporate such principles broadly within the true spirit and scope of the invention as disclosed and claimed herein.

DETAILED DESCRIPTION OF THE INVENTION

In accordance with at least one embodiment of the present invention, there is provided a system, tool and/or method of providing selected images to a user and providing for further manipulation of the images.

Further, at least one embodiment of the present invention facilitates and enhances the visualization and marketing of products represented by the selected images.

In accordance with at least one potentially preferred embodiment of the present invention, a sales person or customer can visualize images of patterned, printed or dyed flooring or floor covering, such as carpet tile, more particularly cushion back carpet tile as described for example in U.S. Pat. Nos. 4,522,857, 5,540,968, 5,545,276, 5,948,500 and 6,203,881 (hereby incorporated by reference herein) and which is dyed (direct or indirect jet dyeing) or printed with a color, pattern, text and/or design as described for example in U.S. Pat. Nos. 4,116,626, 5,136,520, 5,142,481, 5,208,592, and 5,432,502 (hereby incorporated by reference herein).

In accordance with at least one embodiment of the present invention, the manipulation and visualization of a plurality of patterned carpet tiles is facilitated with program functionalities which allow the user to see and select an image of one or more pattern files, arrange the tile images in a selected pattern or layout, place the image arrangement in a room scene, and better appreciate and visualize the flooring.

FIGS. 1-38 are directed to one exemplary embodiment of the present invention where custom buttons (functions) have been programmed for use in, for example, ADOBE PHOTOSHOP 6.0™ to provide the user with enhanced and simplified image manipulation functions to view and further manipulate floorcovering product images, such as pattern carpet tile.

For example, FIGS. 3-11 show additional buttons for 4 tile layout, 9 tile layout, 16 tile layout, etc. FIG. 12 shows additional buttons for 4 tile quarter turn, 4 tile 180 degree, 4 tile 180 degree banded, 4 tile ashlar, 4 tile 2 pattern checkerboard, 4 tile 3 product mosaic, turn tile 1 (90° clockwise), turn tile 2, turn tile 3, etc.

Repeated clicking on the turn tile button will sequentially rotate the selected tile in 90° clockwise movements or increments.

The numbers in FIGS. 7-11 relate to the tile positions in the layout. The arrows in FIGS. 16-19, 26, 27, and 30-38 relate to a default (vertical) tile orientation (such as the pile direction or the process direction). It is to be understood that in most cases these numbers and arrows are for instructional purposes only and that when viewing a particular element, arrangement, or layout, the user or viewer sees only the pattern, design, and/or color of the element (not the arrows and numbers).

FIG. 39 shows exemplary program or process steps contained within the 4 tile quarter turn button. Hence, the user of the present system need only click on the 4 tile quarter turn button to create an image of a 4 tile quarter turn tile arrangement or layout (rather than go through the 28 actions or steps programmed into the 4 tile quarter turn button).

For certain individuals it is difficult to visualize a room having pattern carpet tile on the floor. At least one embodiment of the present invention provides an easy way for them to visualize such a room scene.

For example, FIG. 40 represents a selected layout or arrangement of patterned carpet tile. To aid in visualization of such tile arrangement on a floor, the image can be manipulated and placed in a perspective view in a selected room scene. FIGS. 41 and 42 represent examples of such room scenes of selected tile arrangements or layouts.

FIGS. 44-47 include respective exemplary pattern or tile images (simulated elements).

In accordance with another embodiment of the present invention, the programming or software for the additional buttons (functions) is provided on a tansportable memory media such as a compact disc (CD), a digital video disc (DVD), or the like along with instructions (like FIGS. 1-38), images, and other information. For example, FIG. 49 represents an exemplary screen display from such a CD product which contains the necessary files.

Figure 48:
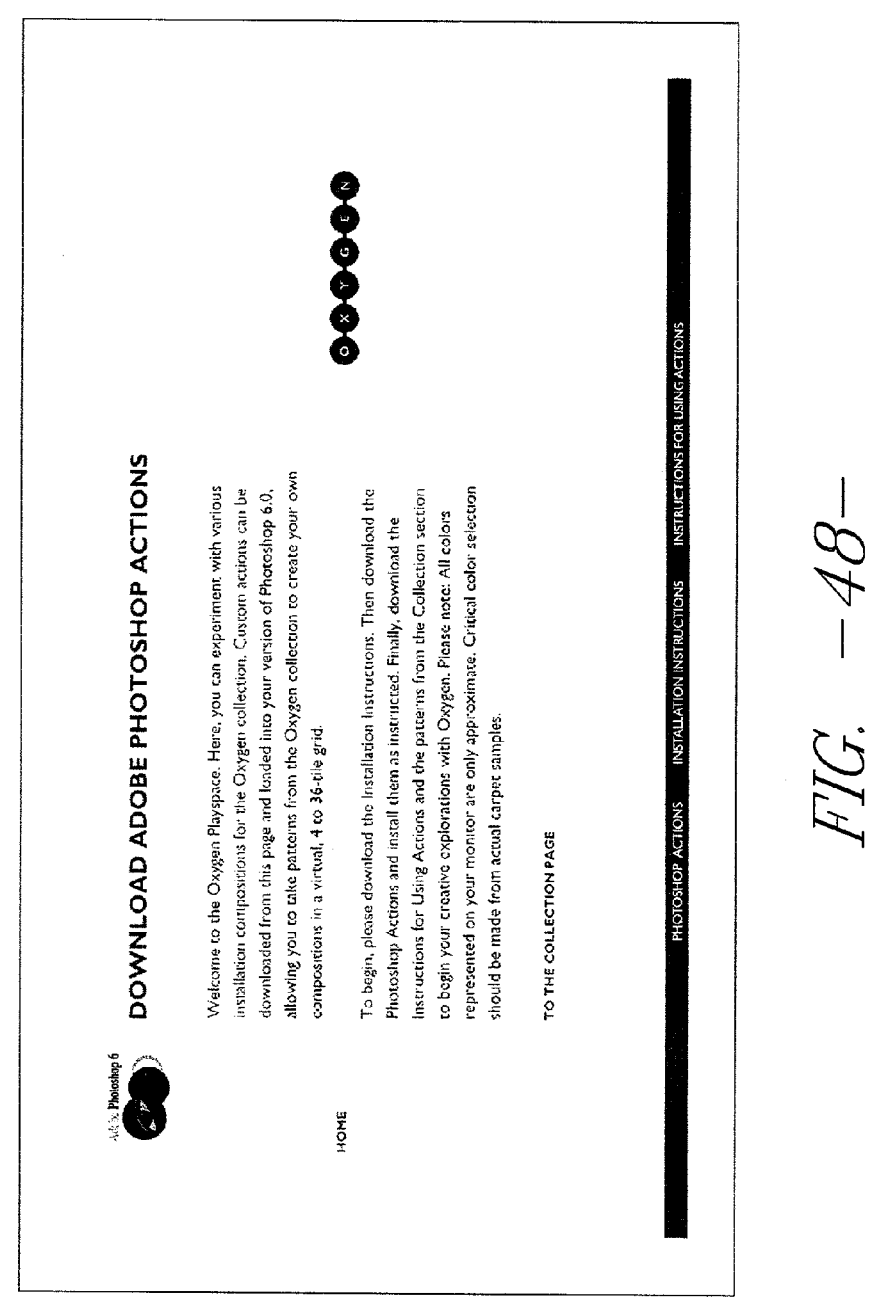

In accordance with another embodiment of the present invention, the user accesses an internet website and is able to download the necessary files (see FIG. 48).

Images of pattern carpet tiles can be provided on a CD and/or can be accessed via the Internet (world wide web, WWW) and located in a database on, for example, a remote mainframe or server. For example, carpet tile designs are available on the Milliken & Company OXYGEN™ web site or the Milliken & Company SAMPLE STUDIO™ web site. These web sites provide authorized users with access to hundreds or thousands of digital design or pattern files on a mainframe or server.

In accordance with one embodiment of the present invention, a software based system, tools and/or method facilitates the complex tasks of assembling multiple digital files, such as carpet patterns, into a personalized or custom layout of the users choice. For example, allowing assembly of 4, 9, 16, 25 and 36 tiles, in a variety of methods. These methods include quarter turn, 180°, 180° banded, ashlar, two pattern checkerboard, and three tile mosaic.

Once composed, further manipulation is given for each tile. With a click of a button, each tile can be turned independently of all others. Hence, the present invention provides a one click carpet tile layout system.

In one example, a preferred CD product is self-running, includes instructions and files. The user places the CD in their CD drive and the CD will bring up the user's Internet browser. Then the user clicks on the instructions button, clicks on the executable file that will set up their ADOBE PHOTOSHOP™ with the additional buttons, and then they can access pattern files (pattern carpet file images), manipulate the images, create room scenes, and the like. Such a CD or DVD product (self contained memory media) can be used by floor covering sales agents, potential customers, architects, designers, and the like. Also, such a CD may include a number of design or pattern files (images) so that the user can create and view floor covering element layouts or arrangements without accessing the Internet or World Wide Web. Sales agents can use the CD and a lap top computer to make a pattern flooring sales presentation allowing for customer or potential customer interaction. This enhances the sales potential of pattern flooring such as pattern carpet tile.

The CD will also preferably include instructions (such as readme files) for installation of the software onto MAC or PC machines.

The pattern image files on the CD may be limited to a standard offering for a particular customer, project, region, etc. For example, Company XYZ may select only 10 patterns and 4 borders (solids) that can be used in their offices. Thus, Company XYZ employees can select from just these 10 patterns and 4 borders to design their respective floor layouts or arrangements.

In accordance with one embodiment of the present invention, an instruction set and/or software tool allows designers to lay tiles out in different quantities and then turn the tiles to create various design effects. Such software will preferably run on ADOBE PHOTOSHOP 6.0™ or the like.

With reference to FIGS. 50, 51 and 52 of the drawings and in accordance with another embodiment of the present invention, a pile direction, process direction, or tile orientation arrow or indicator may be added over the pattern or design. The pile direction arrow may appear as a translucent or semi-transparent object over the tile pattern or design (see FIG. 50). Alternatively, the arrow may be an outline, watermark, or the like. As the pile direction arrow may detract from visualization of a selected carpet tile layout, arrangement, room scene, or the like, it is preferred that the pile direction arrows be capable of being selectively shown (turned on or off, activated or deactivated).

For example, as shown in FIGS. 51 and 52, the user may click on a button which activates the pile direction arrows, Show Pile Direction, or may click on a button which eliminates the pile direction arrows, Show Pattern Only. When arranging tiles in a layout, the user may find the pile direction arrows helpful. When viewing a complete layout, arrangement or room scene, the user may find the pile direction arrows distracting. Also, pile direction arrows can be printed out with the selected layout or arrangement and can serve as installation instructions.

As an example, pile direction arrows can be added as another layer for each pattern or design (tile) on the "fly" as the designs come from the database, and as each layer gets processed (turned), the pile direction arrow is turned as well. The Show Pile Direction button may be a show/hide toggle button and thereby eliminate the need for a Show Pattern Only button. The buttons may provide back logic which allows patterns, arrows, or both to show.

In accordance with at least one embodiment of the present invention, there is provided a display system for the presentation and manipulation of a simulated floor covering installation. The display system utilizes a plurality of manipulatable simulated surface covering or floor covering elements. The simulated floor covering elements are preferably substantially reduced image and shape reproductions of carpeting, ceramic, vinyl, or other floor covering tile elements of interest to a prospective purchaser of such products, designer, architect, or the like.

Each of the simulated elements preferably incorporates a surface design or pattern. According to the potentially preferred practice, the surface design or pattern of each simulated tile element preferably corresponds substantially to a surface design or pattern for a carpet or other floor covering tile element for potential use in a final actual floor covering installation. As will be appreciated, actual floor covering tiles are typically substantially square in geometry with carpet tiles having dimensions in the range of about 12 inches×12 inches, 36 inches×36 inches, or greater. However, carpet tiles may also have any number of other geometries and sizes (octagonal, triangular, rectangular, etc.) as may be useful in facilitating installation and use. Accordingly, while the simulated floor covering tile elements are illustrated as being substantially square corresponding to a greatly reduced to-scale version of a typical carpet tile, it is likewise contemplated that the simulated tile elements may also be of any other geometry corresponding to the floor covering tile products of interest. Preferably, the surface design patterns of the simulated floor covering tile elements corresponds substantially to the actual surface design patterns across actual commercially available prospective floor covering tile elements. That is, the simulated floor covering tile elements preferably corresponds to a substantially complete but reduced version of the surface design or pattern across the floor covering tile element being simulated.

Although the present invention finds special applicability to carpet tiles, the arrangement or pattern presented by the elements may correspond to a selected pattern or arrangement tufted, woven, printed, or dyed on a textile substrate such as a carpet substrate for broadloom, area rug, runner, or floor mat, or a fabric substrate for wall coverings, panel coverings, and the like.

According to a potentially preferred practice, the simulated floor covering tile elements are actual carpet tile surface design or pattern images (digital files). By way of example only, and not limitation, it is contemplated that such designs may be stored in a database or archive on a computer mainframe or server. In practice, the surface designs or patterns of the simulated tile elements may be acquired in the form of digital images in JPEG or other suitable format from a library of available designs maintained by a manufacturer or distributor of the floor covering tile elements of interest. Such libraries are preferably accessible via the Internet and may be downloaded using image acquisition software such as ADOBE ACROBAT, ADOBE PHOTOSHOP, or the like. The arrangements, layouts, and/or element designs, patterns, and/or colors of the present invention may be printed out on paper by a color laser printer, ink jet printer, bubble jet printer, photocopy machine, screen printer, or the like. Also, they may be produced photographically.

According to one potentially preferred practice of the present invention, the resultant simulated floor covering tile elements may be selectively placed in an arrangement substantially corresponding to at least a portion of a proposed arrangement of floor covering tiles across a flooring surface in the installation being simulated.

According to one potentially preferred feature of the present invention, the simulated floor covering tile elements may be readily manipulated to simulate a number of different arrangements of various prospective floor covering tile elements. The evaluation of various simulated installation alternatives is facilitated by the user friendly manipulation of the simulated floor covering tile elements since the relative positions of each tile element may be maintained unless and until such elements are moved for purposes of evaluation of a different configuration and/or combination of surface designs of the same tiles or different tile elements. Thus, one or more of the individual simulated floor covering elements may be moved within an arrangement without disturbing the others. In this way, multiple alternative installations may be rapidly and easily simulated. Such simulation of patterns, arrangements, configurations, combinations, etc. facilitates the user's visualization and appreciation thereof. This is especially adapted to facilitate a user's visualization of patterned carpet tile. Without such an aid, it is difficult for certain individuals to visualize such patterned carpet tile patterns, arrangements, layouts, etc.

By way of example only, and not limitation, selected identical simulated carpet tile elements may be arranged in a so-called "monolithic" orientation relative to one another such that the surface designs or patterns across each of the simulated carpet tile elements are arranged in a repeating substantially identical orientation. Alternatively, the simulated carpet tile elements may be arranged in a slightly different manner wherein every other simulated tile element has been rotated clockwise 90 degrees. This rotation of selected elements may be performed by simple single click manipulation. Such a change can give rise to a substantially different overall appearance to the pattern arrangement. Likewise, the simulated carpet tile elements may have been rotated 180 degrees to simulate the appearance of rotating the carpet tiles at alternating rows of an actual installation. Again, this manipulation of the tiles gives a different overall appearance. Still further, the simulated carpet tile elements may include multiple designs or patterns in a single arrangement. Such an arrangement thus simulates the use of multiple carpet tile elements incorporating multiple designs in a common installation. For example, tile elements may be laid out with alternating designs in a checkerboard-like arrangement.

One benefit of the potentially preferred system according to the present invention is the ability to view a simulated floor covering installation from different angles. This ability is facilitated by the fact that the simulated floor covering tile elements may be viewed from a substantially flat plan perspective as illustrated in, for example, FIG. 40 as well as from a perspective view as illustrated in FIGS. 41 and 42. As will be appreciated, such elevation or perspectives may be useful in simulating the appearance of the floor covering installation once installation has taken place.

In accordance with one example, each of the simulated tiles has the same pattern or design thereon and is placed in the same orientation. Such designs may be printed on the actual tiles so that the design or pattern of adjacent tiles match up or are in accurate registration. This can facilitate the visualization of a carpet tile installation or arrangement of complex designs or patterns which accurately match or register with that of adjacent tiles. Also, this can facilitate the visualization of a broadloom product or the like.

In accordance with one aspect of the present invention, there is provided an improved method of marketing patterned carpet tile and/or carpet designs and design arrangements by using the system, tool or method of the present invention. Also, a potential customer may be shown a multitude of patterns, designs, arrangements, etc. by a salesperson. This marketing approach is preferred over the conventional approach of using actual carpet tile samples or brochures showing such tiles. Further, the customer can arrange and rearrange the tile elements at their leisure and as they see fit and thereby enjoy the experience of designing a floor covering installation.

The display system and method of the present invention is especially well suited for the marketing of patterned carpet tile products manufactured and marketed by Milliken & Company of LaGrange, Ga. Such patterned carpet tile products provide for precise modulation, substantially 100% pattern match, dye injection printing of designs, patterns and/or colors, custom designs and images, printing of individual tiles, a myriad of installation options (mosaic, rotations, patchworks, insets, monolithic, ashlar, etc.), coordinates of different designs, patterns, colors, solid borders, and the like.

The display system of the present invention helps sales reps to use any carpet tile and helps the customer understand their options. The system provides ease and flexibility. For example:

Sales Rep John Doe, is working on the ACME project with Design Firm, Inc.

John finds that Designer A likes pattern 1 and pattern 2.

He provides design JPEGS of at least pattern 1 and pattern 2 to Designer A.

Designer A now can use the system, tools and/or method of the present invention to look at all sorts of different options for installing patterns 1 and 2.

She finds that she wants to use a monolithic installation, and also a 180-degree type of installation.

John also finds that Designer B likes patterns 1, 2 and 3.

He provides design JPEGS of at least patterns 1, 2 and 3 to Designer B.

Designer B chooses a mosaic installation utilizing all three patterns.

John may never use these patterns again, but instead of a huge and expensive process, he has spent little time and effort to show something that traditionally takes weeks. It does not matter which particular designs are a part of the process as the intention is that there will hopefully be hundreds of different and new designs in use each day.

In accordance with another example, a customer decides that they want to work with Milliken & Company and chooses a few patterns that they would like to work with. A Milliken & Company sales rep brings a CD to the customer with the patterns they are interested in. The customer plays all options are explored in a fun manner within minutes. Complexity is reduced. Then, a decision is made and product ordered. The customer can keep the CD, plots, and the like.

In accordance with another embodiment of the present invention, a potential customer, designer, architect, or the like who is interested in selecting and/or purchasing a patterned floor covering or surface covering product such as patterned carpet tile (these may be tufted, bonded, printed, dyed, woven, knit, non-woven, yarn dyed, solution dyed, textured, carved, and/or the like) accesses a floor covering supplier website and downloads a software based system, tool, plug-in, or the like which provides for easy manipulation of floor covering product design or pattern images. Then, the potential customer goes to the product supplier's floor covering product design or pattern image database, archive, collection, or the like having hundreds or thousands of patterns, designs, shapes, sizes, or colors and selects one or more patterns, designs, shapes, sizes, and/or colors of interest. Next, the potential customer uses the downloaded software based tool or system to view several potential floor covering product layouts or arrangements, and may view these in plan view and/or in one or more room scenes.

If the potential customer (user) is satisfied or happy with one or more of the arrangements or layouts, they may order samples of each product (tile) in order to see the true color and look of the actual product and/or they may order the actual product for installation. Preferably, they will order such samples and/or products on-line (over the Internet or WWW). Alternatively, they can order the products and/or samples by calling in the order, going to a retailer, dealer or distributor, faxing the order, mailing the order, or the like.

If the potential customer (user) is not happy or satisfied with the arrangements and layouts they have viewed, they can select alternative patterns, designs, colors, shapes, or sizes (simulated floor covering elements) and view additional arrangements, layouts, scenes, etc.

The potential customer may also print out selected potential arrangements, layouts, scenes, and/or the like, forward them to others, download or save them for later viewing or use, and/or the like.

The potential customer can accomplish this process on-line, on their computer, twenty-four hours a day, seven days a week, at their convenience or leisure, from any location with a computer and/or Internet access, and the like. This process greatly enhances and facilitates the process or method of selecting, purchasing, or sampling floor covering or surface covering products especially patterned products and provides the purchaser or user with a greater degree of satisfaction and enjoyment with the product and process because the customer or user was involved, created custom or personal layouts or arrangements, was not limited in their selection of patterns, and/or the like. Also, this process may reduce the time and effort required to market or merchandise such floor covering or surface covering products, may increase sales and utilization of such products, and may thereby reduce costs and make for better products.

In accordance with another embodiment of the present invention, the potential customer need not down-load the system, tool, plug-in, or the like from the supplier's website, but instead the system, tool, method or the like is available right on the supplier's web site and can be used by the potential customer (user).

Also, in accordance with at least one embodiment of the present invention, the computer or terminal used by the potential customer (user) may be located at one or more of the user's home or office, may be the user's lap top or other portable system, may be the sales rep's lap top or other portable system, may be a computer or terminal located at a retailer, dealer, distributor, or supplier location, may be a computer or terminal at a booth, kiosk, island, or the like at a trade show, mall, school, stadium, airport, hotel room, or the like. For example, a computer or terminal may be located in the floor covering section of a retailer or dealer.

Also, a print-out of the selected layout or arrangement can be used as a guide or instructions for an installer.

The display system, tool, method and/or product of the present invention can reduce marketing cost, speed up the marketing process, enhance the customer's or buyer's experience, facilitate a better understanding of the product offering, and/or the like.

One embodiment of the present invention is directed to a display system and related method permitting a prospective purchaser of floor coverings to engage in the contemporaneous manipulation and evaluation of various combinations of surface patterns and/or placement orientations for floor covering elements prior to actual purchase or installation. For example, simulated tile elements having surface patterns corresponding to the surface patterns of actual floor covering tile elements are displayed in a manner such that one or more of the simulated tile elements may be rotated or replaced to simulate alternative arrangements.

It is contemplated that a person skilled in the art may make modifications to the embodiments shown herein within the scope and intent of the present invention.

It is believed that the present invention provides a new and useful system, tool, method and/or product for the rapid and cost effective evaluation of multiple potential floor covering alternatives. While specific embodiments of the present invention have been illustrated and described, it is to be understood that the invention is in no way to be limited to any such illustration and described embodiments since modifications may be made and other embodiments of the principles of this invention may occur to those of skill in the art to which this invention pertains. For example, the tile elements may include solid color tile elements (such as border tile), may include alternative patterns or designs as inlays, may include alternative bases as entry way materials, and/or the like. Therefore, it is intended by the appended claims to cover all such modifications and other broad principles of this invention within the true spirit and scope thereof.

What is claimed is:

1. A display system for simulated presentation of a plurality of alternative arrangements of prospective actual independently displaceable floor covering elements across a flooring support surface, the display system comprising:
   a plurality of viewable and manipulatable simulated elements, wherein the simulated elements are viewed on a computer display device and are manipulated via a computer processor, and wherein said simulated elements have a shape and size substantially corresponding to a reduced to-scale version of the shape and size of the prospective actual independently displaceable floor covering elements and wherein said simulated elements further include a surface design or pattern comprising a reduced reproduction of a surface design or pattern of at least one prospective actual independently displaceable floor covering element, said simulated elements being arrangeable in a manipulatable array to simulate a first prospective actual arrangement of the prospective actual independently displaceable floor covering elements and such that said manipulatable array is alterable by means of rotating at least one of the simulated elements about the center of the simulated element 90, 180, or 270 degrees while maintaining the element placement location relative to the other simulated elements to simulate at least a second prospective arrangement of the prospective actual independently displaceable floor covering elements, and
   wherein at least a portion of the simulated elements within the manipulatable array are displayed in conjunction with a pile direction indicator independent of the surface design or pattern.

2. A system for the simulated presentation of a plurality of alternative arrangements of prospective actual floor covering tile elements across a flooring support surface, the system comprising:
   means for viewing and manipulating a plurality of viewable and manipulatable simulated tile elements comprising reduced dimension reproductions of the prospective actual floor covering tile elements, wherein the simulated tile elements are viewed on a computer display device and are manipulated via a computer processor, and wherein said simulated tile elements have a shape and size substantially corresponding to a reduced version of the shape and size of the prospective actual floor covering tile elements and wherein said simulated tile elements further include a surface design or pattern comprising a substantially complete reduced reproduction of a surface design or pattern of at least one prospective actual floor covering tile element, said simulated the elements being arrangeable in a manipulatable array to simulate a first prospective arrangement of the prospective actual floor covering tile elements across a flooring surface and such that said manipulatable array is alterable by rotating at least one of the simulated tile elements about the center of the simulated tile element 90, 180, or 270 degrees while maintaining the tile placement location relative to the other simulated tile elements to simulate at least a second prospective arrangement of the prospective actual floor covering tile elements across a flooring surface, and
   wherein at least a portion of the simulated elements within the manipulatable array are displayed in conjunction with a pile direction indicator independent of the surface design or pattern.

3. A method for simulating at least one prospective arrangement of floor covering tile elements across a flooring support surface, comprising:
   arranging a plurality of viewable and manipulatable simulated tile elements in an array substantially corresponding to at least a portion of the prospective arrangement of floor covering tile elements across a flooring support surface, wherein said simulated tile elements include a surface design, pattern or color corresponding to a surface design, pattern or color of a prospective floor covering tile element within said prospective arrangement of floor covering tile elements across a flooring support surface, said simulated tile elements being selectively replaceable and adjustable by manipulation of at least one of said simulated tile elements whereby said at least one of said simulated tile elements is selectively rotated about the center of the simulated tile element 90, 180, or 270 degrees while maintaining the tile placement location relative to the other simulated tile elements such that said array is alterable to simulate one or more alternative arrangements of floor covering tile elements, and wherein at least a portion of the simulated elements within the array are displayed in conjunction with a pile direction indicator independent of a surface design or pattern.

* * * * *